(12) United States Patent
Dixon et al.

(10) Patent No.: US 8,260,720 B1
(45) Date of Patent: Sep. 4, 2012

(54) SYSTEMS AND METHODS FOR EMERGENCY DURESS SECURITY CODE AND RELATED INSTRUCTIONS

(75) Inventors: David Patrick Dixon, Boerne, TX (US); Gary Scott Harris, Boerne, TX (US)

(73) Assignee: United Services Automobile Association, San Antonio, TX (US)

( * ) Notice: Subject to any disclaimer, the term of this patent is extended or adjusted under 35 U.S.C. 154(b) by 172 days.

(21) Appl. No.: 12/410,688

(22) Filed: Mar. 25, 2009

(51) Int. Cl.
*G06Q 99/00* (2006.01)

(52) U.S. Cl. .......... 705/67; 235/379; 235/380; 235/382; 726/7; 726/28; 705/43; 705/64; 705/76

(58) Field of Classification Search .............. 705/50–79; 455/410
See application file for complete search history.

(56) References Cited

U.S. PATENT DOCUMENTS

| | | | | | |
|---|---|---|---|---|---|
| 5,130,519 | A * | 7/1992 | Bush et al. | ..................... | 235/380 |
| 5,354,974 | A * | 10/1994 | Eisenberg | ..................... | 235/379 |
| 5,731,575 | A * | 3/1998 | Zingher et al. | ................. | 235/379 |
| 6,550,671 | B1* | 4/2003 | Brown et al. | .................. | 235/379 |
| 6,679,422 | B2* | 1/2004 | Brown et al. | .................. | 235/379 |
| 6,685,087 | B2* | 2/2004 | Brown et al. | .................. | 235/380 |
| 6,732,278 | B2* | 5/2004 | Baird et al. | ........................ | 726/7 |
| 6,871,288 | B2* | 3/2005 | Russikoff | ......................... | 726/19 |
| 7,004,387 | B1* | 2/2006 | Kaimikaua et al. | ............ | 235/380 |
| 7,028,888 | B2* | 4/2006 | Laskowski | ..................... | 235/379 |
| 7,287,009 | B1* | 10/2007 | Liebermann | ..................... | 705/42 |
| 7,357,307 | B1* | 4/2008 | Block et al. | .................... | 235/379 |
| 7,392,395 | B2* | 6/2008 | Ginter et al. | ................... | 713/176 |
| 7,415,720 | B2* | 8/2008 | Jung | ................................. | 726/2 |
| 7,497,371 | B1* | 3/2009 | Sparks | ........................... | 235/379 |
| 7,549,574 | B2* | 6/2009 | Crowell et al. | ................ | 235/379 |
| 7,552,467 | B2* | 6/2009 | Lindsay | ............................ | 726/5 |
| 7,603,565 | B2* | 10/2009 | Baird et al. | .................... | 713/184 |
| 7,628,321 | B2* | 12/2009 | Keohane et al. | .............. | 235/379 |
| 7,665,146 | B2* | 2/2010 | Munje et al. | ..................... | 726/28 |
| 7,726,557 | B2* | 6/2010 | Bosch et al. | .................... | 235/379 |
| 7,980,464 | B1* | 7/2011 | Sarris et al. | .................... | 235/379 |
| 2003/0085271 | A1* | 5/2003 | Laskowski | ..................... | 235/379 |

(Continued)

OTHER PUBLICATIONS

White, How Computers Work, Nov. 2007, 9th Ed., all pages.*
Axnick, Karl B. et al: "Face and Pose Recognition for Robotic Surveillance", www.araa.asn.au/acra/acra2005/papers/axnick.pdf, 9 pages.

*Primary Examiner* — Jacob C. Coppola
(74) *Attorney, Agent, or Firm* — Brooks, Cameron & Huebsch, PLLC

(57) ABSTRACT

A system, method, and computer-usable medium are disclosed for identifying transactions resulting from the access of a financial account while a user is under duress. A user provides a duress shared secret. Instructions associated with the duress shared secret are processed and available financial account operations, along with associated financial account information, are displayed according to the associated instructions. The cash or electronic funds proceeds of a financial transaction operation are tagged with electronic fraud identification data. Tagged funds received by a financial institution are processed to extract their associated fraud identification data, which is then used to generate fraud trail data. If the tagged funds are used to originate follow-on financial transactions, they are likewise tagged with fraud identification data, which is likewise used to generate fraud trail data. Tagged funds are recovered by processing a tagged financial transaction to extract its associated fraud identification data, which is then used to query repositories of fraud trail data. Fraud trail data that matches the query is then processed to determine receiving account information. Rescission transactions are performed to recover funds up to the amount of the tagged financial transaction from the receiving account.

30 Claims, 14 Drawing Sheets

U.S. PATENT DOCUMENTS

| | | |
|---|---|---|
| 2003/0141372 A1 | 7/2003 | Brown et al. |
| 2003/0195850 A1* | 10/2003 | Stallworth ................ 705/43 |
| 2003/0208439 A1* | 11/2003 | Rast ........................ 705/38 |
| 2004/0158523 A1* | 8/2004 | Dort ........................ 705/42 |
| 2005/0239477 A1* | 10/2005 | Kim et al. .............. 455/456.1 |
| 2005/0258234 A1* | 11/2005 | Silverbrook et al. ...... 235/379 |
| 2007/0250920 A1* | 10/2007 | Lindsay .................... 726/7 |
| 2008/0223930 A1* | 9/2008 | Rolland et al. ............. 235/385 |
| 2008/0251578 A1* | 10/2008 | Jansing .................... 235/379 |

* cited by examiner

SYSTEMS AND METHODS FOR EMERGENCY DURESS SECURITY CODE AND RELATED INSTRUCTIONS

BACKGROUND

Field of the Disclosure

Embodiments of the disclosure relate in general to the field of computers and similar technologies, and in particular to software utilized in this field. Still more particularly, it provides a system, method, and computer-usable medium for identifying transactions resulting from the access of a financial account while a user is under duress.

BACKGROUND OF THE DISCLOSURE

Today's consumers no longer need to physically visit their bank or brokerage to manage their financial accounts. For example, the use of automated teller machines (ATMs) has now become commonplace. In addition, the advent of on-line banking and stock trading, coupled with the widespread availability of the Internet and wireless networks, allows many consumers to conveniently access their financial accounts practically anywhere, anytime, and any way they wish. However, today's criminals have also become more sophisticated. Identity theft is a very real and growing problem, and there are innumerable instances of criminals forcing a consumer to provide their personal identification number (PIN) at an ATM machine. The incidence of home break-ins are also on the rise, with the homeowner being held hostage until they provide access to their financial accounts, which are then used by criminals to commit large scale financial fraud.

In these situations, the consumer may be coerced into providing such access as a result of being physically, verbally, or emotionally intimidated, either directly or indirectly. For example, the criminal may threaten physical harm to a loved one of the consumer being held hostage if such access is not provided. Currently, consumers have limited methods to indicate they are under duress when performing an on-line financial transaction, whether it is accessing their financial accounts at an ATM, from their personal computer, or even their mobile phone.

Current approaches to this issue include the provision of secondary passwords and PINS to be used when the user is under duress. These secondary passwords and PINS may provide temporary, limited, or spoofed access to the user's financial accounts. As an example, not all financial accounts may be displayed, or alternatively, the accounts are falsely displayed with low account balances. As another example, the actual account balances are displayed, but account operations, such as funds transfers, are spoofed instead. However, today's criminals are now technology savvy. They may have prior knowledge of not only the number and types of financial accounts belonging to the user, but their respective value as well. Furthermore, they may use today's technology to their own advantage and are able to monitor the receipt of funds being transferred into an account they control. In such situations, the criminal will not be fooled by spoofed financial account operations. They will want to have proof that their fraudulent transactions have been completed. Unfortunately, tracking and recovering such funds transfers is difficult, tedious, and typically less than effective.

BRIEF SUMMARY

A system, method, and computer-usable medium are disclosed for identifying transactions resulting from the access of a financial account while a user is under duress. In various embodiments, a user provides a duress shared secret to a fraud management system to indicate that they are providing access to a financial account while under duress. As an example, a user may be coerced into providing such access as a result of being physically, verbally, or emotionally intimidated, either directly or indirectly. Instructions associated with the duress shared secret are processed, fraud monitoring operations are initiated, and duress event notifications are generated and delivered, as described in greater detail herein. Available financial account operations, along with associated financial account information, are displayed according to the associated instructions. If the selected financial account operation is to perform a financial transaction, then input received from the user is processed according to the associated instructions to generate a financial transaction. Once the financial transaction is generated, fraud identification data is then generated from the duress shared secret and data associated with the financial transaction. In various embodiments, cash funds, such as those disbursed from an automated teller machine (ATM) are invisibly imprinted with the fraud identification information prior to their disbursement. In various other embodiments, the proceeds of the financial transaction are electronic funds are tagged with electronic fraud identification data. Once the electronic funds are tagged with fraud identification data, the funds transfer of the electronic funds is initiated.

In various embodiments, tagged funds proceeds of a financial transaction are received by a receiving financial institution. In these and other embodiments, the tagged funds are cash funds or electronic funds. Once received, the tagged funds are processed to extract their associated fraud identification data. If the tagged funds are cash funds, then a time-stamped fraud identification query is generated and the extracted fraud identification data is appended. The time-stamped fraud identification query is then transmitted to law enforcement agencies and the originating financial institution for processing. If the query response is positive, then tagged cash funds are retained for evidence in criminal prosecution and recovery by their originating financial institution. If the tagged funds are electronic funds, then a time-stamped acknowledgement of the receipt of a tagged electronic funds transfer ("tagged EFT receipt") is generated. The extracted fraud identification data and the information related to the target receiving account are then appended to the tagged EFT receipt, which is then transmitted to law enforcement agencies, financial network operators, financial clearing houses, and the originating financial institution. The tagged EFT funds are then deposited into the target receiving account, which is monitored for the generation of new EFTs. If a new EFT is generated from the target receiving account, then a time-stamped tagged EFT alert ("tagged EFT alert") is generated and likewise transmitted to law enforcement agencies, financial network operators, clearing houses, and the financial institution that originated the original tagged EFT. Data related to the outbound EFT is then processed and tagged with the extracted fraud identification data, followed by the initiation of the outbound EFT. The tagged EFT alert is then stored as fraud trail data.

In various embodiments, tagged funds are recovered by first selecting a tagged financial transaction initiated by a user while under duress, followed by extracting its associated fraud identification data. Repositories of fraud trail data, as described in greater detail herein, are then queried to identify matching fraud identification data. Once matching fraud identification data has been identified, fraud trail data corresponding to the matching fraud identification data is retrieved and then processed to determine receiving account information. The receiving account is then queried to determine availability of funds. A rescission transaction is performed to recover funds up to the amount of the tagged financial transaction. If there are insufficient funds available in the receiving account, then a repository of fraud trail data at the receiving financial institution is queried to identify tagged funds transfer transactions originating from the receiving account. Follow-on tagged funds transfer transactions are then selected and processed to extract financial transaction information related to the destination account of the follow-on electronic funds transaction. The destination account is then queried to determine the availability of funds and the process is continued with a follow-on rescission transaction.

BRIEF DESCRIPTION OF THE DRAWINGS

Selected embodiments of the disclosure may be understood, and its numerous objects and features obtained, when the following detailed description is considered in conjunction with the following drawings, in which.

DETAILED DESCRIPTION

Figure 1:
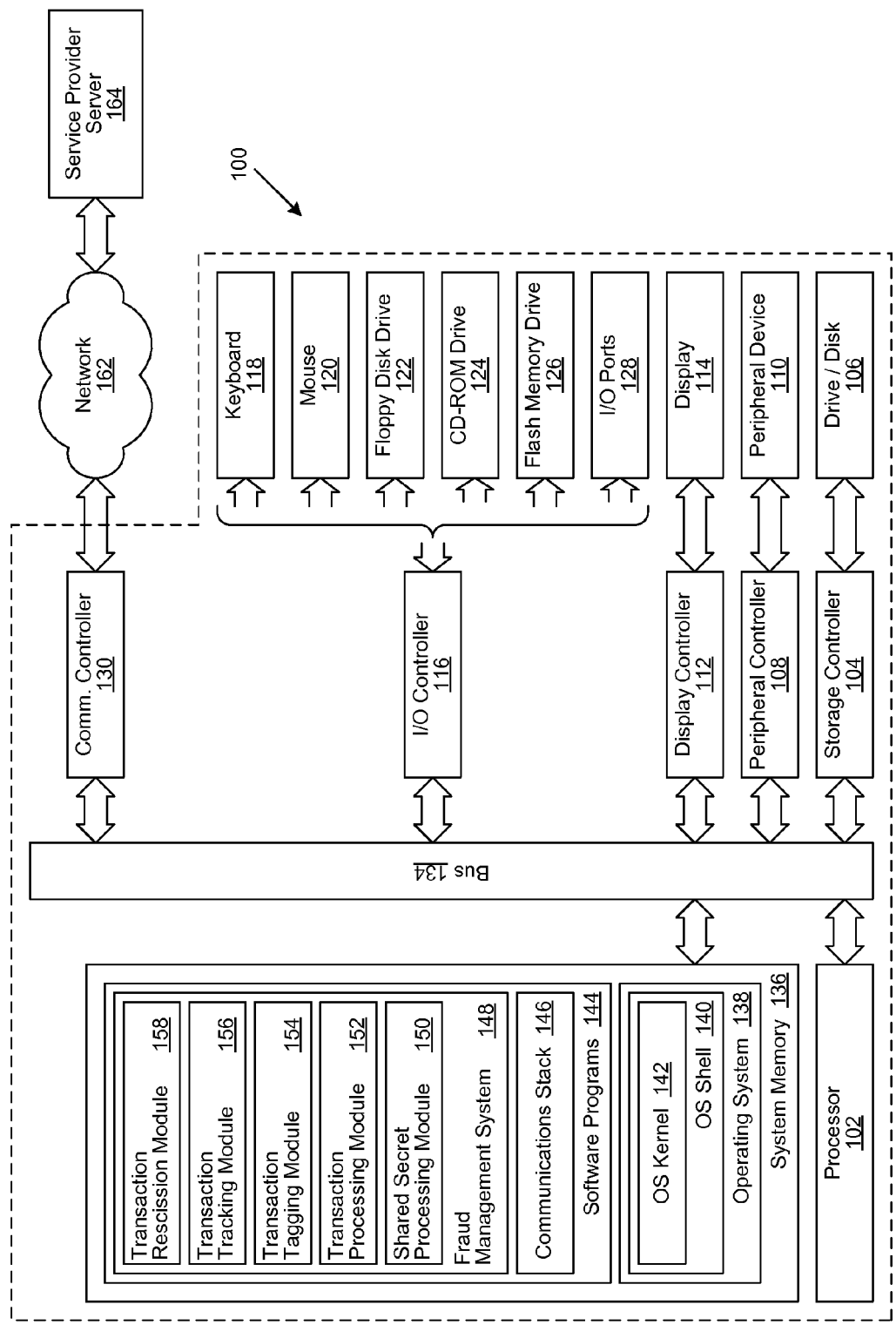
FIG. 1 depicts an exemplary client information processing system (IPS) in which embodiments of the disclosure may be implemented.

A method, system and computer-usable medium are disclosed for identifying transactions resulting from the access of a financial account while a user is under duress. As will be appreciated by one skilled in the art, the disclosure may be embodied as a method, system, or computer program product. Accordingly, various embodiments may be implemented entirely in hardware, entirely in software (including firmware, resident software, micro-code, etc.) or in an embodiment combining software and hardware. These various embodiments may all generally be referred to herein as a "circuit," "module," or "system."

For purposes of this disclosure, an information processing system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information processing system may be a personal computer, a personal digital assistant (PDA), a wirelessly-enabled mobile telephone, a server, a network storage device, or any other suitable device and may vary in size, shape, performance, functionality, and price. The information processing system may include random access memory (RAM), one or more processing resources such as a central processing unit (CPU) or hardware or software control logic, read only memory (ROM), and/or other types of nonvolatile memory. Additional components of the information processing system may include one or more disk drives, one or more network ports for communicating with external devices, as well as various input and output (I/O) devices, such as a keyboard, a mouse, and a video display. The information processing system may also include one or more buses operable to transmit communications between the various hardware components.

Additionally, various embodiments may take the form of a computer program product on a computer-usable storage medium having computer-usable program code embodied in the medium. Any suitable computer usable or computer readable medium may be utilized. The computer-usable or computer-readable medium may be, for example, but not limited to, an electronic, magnetic, optical, electromagnetic, infrared, or semiconductor system, apparatus, device, or propagation medium. A non-exhaustive list of more specific examples of the computer-readable medium would include the following: an electrical connection having one or more wires, an optical fiber, a transmission media such as those supporting the Internet or an intranet, a random access memory (RAM), a read-only memory (ROM), an erasable programmable read-only memory (EPROM or Flash memory), a magnetic storage device, a portable computer diskette, a hard disk, an optical storage device, a portable compact disc read-only memory (CD-ROM), or a digital versatile disk (DVD). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therein, either in baseband or as part of a carrier wave. The computer usable program code may be transmitted using any appropriate medium, including but not limited to the Internet, wireline, optical fiber cable, wireless, radio frequency (RF), etc.

Computer program code for carrying out operations in various embodiments may be written in an object oriented programming language such as Java, Smalltalk, C++ or the like. However, the computer program code for carrying out operations in various embodiments may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN), a wide area network (WAN), a wireless local area network (WLAN), a wireless wide area network (WWAN), a or personal area network (PAN). In addition, the connection may be made to an external computer (for example, through the Internet using an Internet Service Provider) using any combination of telecommunication technologies and protocols operable to establish a network connection for the exchange of information.

Embodiments of the disclosure are described below with reference to flowchart illustrations and/or block diagrams of methods, apparatus (systems) and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer, information processing system, or other programmable data processing apparatus, to function in a particular manner such that the instructions stored in the computer-readable memory produce an article of manufacture including instruction means which implement the function/act specified in the flowchart and/or block diagram block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a generalized block diagram of an exemplary client information processing system (IPS) 100 in which various embodiments may be utilized. Client IPS 100 includes a processor unit 102 that is coupled to one or more buses 134. A display controller 112, which controls a display 114, is also coupled to or more buses 134, along with peripheral controller 108, which controls one or more peripheral devices 110. An input/output (I/O) controller 116 affords communication with various I/O devices, including a keyboard 118, a mouse 120, a floppy disk drive 122, a Compact Disk-Read Only Memory (CD-ROM) drive 124, a flash drive memory 126, and one or more I/O ports 128. The format of the ports connected to the I/O controller 116 may be any known to those skilled in the art of computer architecture, including but not limited to Universal Serial Bus (USB) ports.

Client IPS 100 is able to communicate with a service provider server 164 via a network 162 using a communications controller 130, which is coupled to one or more buses 134. Network 162 may be the public switched telephone network (PSTN), an external network such as the public Internet, an internal network such as an Ethernet-based local area network (LAN), a Virtual Private Network (VPN) such as a corporate intranet, or any combination of telecommunication technologies and protocols operable to establish a network connection for the exchange of information. Using network 162, client IPS 100 is able to access service provider server 164.

A storage controller 104 is also coupled to one or more buses 134. Storage controller 104 interfaces with storage disk or drive 106, which may comprise a magnetic storage device such as a hard disk or tape drive. In various embodiments, storage disk or drive 106 populates a system memory 136, which is also coupled to one or more buses 134. Data that populates system memory 136 includes the client IPS 100 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, various embodiments may also support other user interface modes, such as graphical, voice, gestural, etc. As depicted, OS 138 also includes kernel 142, which includes lower levels of functionality for OS 138, including services used by other parts of OS 138 and software programs 144, including memory management, process and task management, disk management, and mouse and keyboard management.

Software programs 144 may include a communications stack 146, browser 156, email client 158, and other programs 160. The communications stack 146 is operable to implement any communication protocol enabling various embodiments of the disclosure. Browser 156 includes program modules and instructions enabling a World Wide Web (WWW) client (i.e., IPS 100) to send and receive network messages to the Internet using HyperText Transfer Protocol (HTTP) messaging, thus enabling communication with service provider server 164. Software programs 144 also include a fraud management system 148. In various embodiments, the fraud management system 148 comprises a shared secret processing module 150, a transaction processing module 152, a transaction tagging module 154, a transaction tracking module 156, and a transaction rescission module 158. The fraud management system 148 includes computer executable instructions for implementing the processes described in FIGS. 2-7 described hereinbelow. In one embodiment, client IPS 100 is able to download the computer executable instructions of the fraud management system 148 from a service provider server 164 located at a remote location. In another embodiment, the computer executable instructions of the fraud management system 148 are provided by a service provider as a service, such as a Web service implemented on a Service-Oriented Architecture (SOA), to the client IPS 100 on an on-demand basis.

The hardware elements depicted in client IPS 100 are not intended to be exhaustive, but rather are representative to highlight components used by the disclosure. For instance, client IPS 100 may include alternate memory storage devices such as magnetic cassettes, Digital Versatile Disks (DVDs), Bernoulli cartridges, and the like. These and other variations are intended to be within the spirit and scope of the disclosure.

Figure 2:
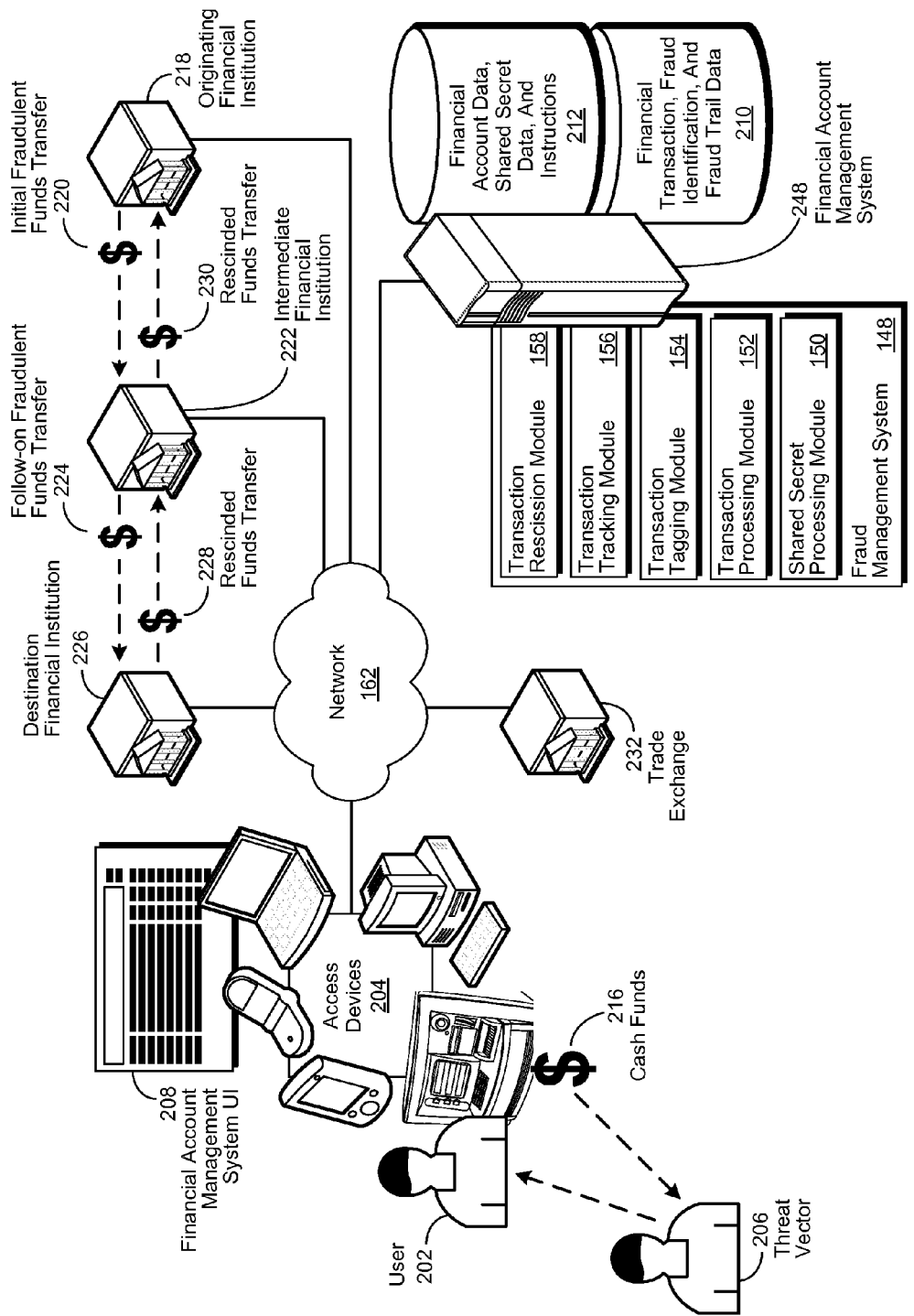
FIG. 2 is a simplified block diagram of a fraud management system as implemented in accordance with an embodiment of the disclosure.

FIG. 2 is a simplified block diagram of a fraud management system as implemented in accordance with an embodiment of the disclosure. In various embodiments, a financial account management system 248 comprises a fraud management system 148, a repository of financial transaction, fraud identification, and fraud trail data 210 and a repository of financial account data, shared secret data and instructions 212. The fraud management system 148 further comprises a shared secret processing module 150, a transaction processing module, 152, a transaction tagging module 154, a transaction tracking module 156, and a transaction rescission module 158. In these and other embodiments, a user 202 uses an access device 204 to establish an on-line session with the shared secret processing module 150 of the fraud management system 148 over a connection to network 162. In various embodiments, an access device 204 may comprise an automated teller machine (ATM), a personal computer, a laptop computer, or a tablet computer. The computing device 204 may also comprise a personal digital assistant (PDA), a mobile telephone, or any other suitable device operable to display the financial management system user interface (UI) 208 and establish a connection with network 162.

Using financial management system UI 208, the user 202 provides a user identification (ID) and a shared secret, such as a personal identification number (PIN) or a password, and is authenticated to the shared secret processing module 150. In various embodiments, the user 202 then creates a duress shared secret. As used herein, a duress shared secret refers to a shared secret provided by a user to indicate that they are providing access to a financial account while under duress. As an example, a user may be coerced into providing such access as a result of being physically, verbally, or emotionally intimidated, either directly or indirectly. Once the duress shared secret is created, instructions to be executed by the fraud management system 148 upon use of the duress shared secret are created and configured. More specifically, the instructions are used to determine the degree of access provided to a financial account, the information related to the financial account that is displayed, and the actions that are allowed to be performed as described in greater detail herein.

In various embodiments, the proceeds of a financial transaction initiated by a user 202 while under duress ("duress financial transaction") are tagged. As used herein, a duress financial transaction is a financial transaction initiated by a user while under duress, as described in greater detail herein. In these and other embodiments, the user 202 provides a duress shared secret while under duress, such as from a threat vector 206. Instructions associated with the duress shared secret are processed, fraud monitoring operations are initiated, and duress event notifications are generated and delivered, as described in greater detail herein, indicating that the financial account is being accessed while the user is under duress. In one embodiment, the instructions associated with the duress shared secret include the monitoring of other financial accounts associated with the user 202, such as investment accounts at a trade exchange 232. In another embodiment, the associated instructions include the notification of law enforcement authorities.

Available financial account operations are displayed within the financial account management system UI 208 and an account operation is selected to perform according to the associated instructions. Financial information associated with the selected financial account operation is then displayed, within the financial account management system UI 208, likewise according to the associated instructions. If the selected financial account operation is to perform a financial transaction, then input is received from the user 202 within the financial account management system UI 208 to generate a financial transaction. As an example, the input received may include a request to disburse $400.00 in cash funds from an automated teller machine (ATM). As another example, the input received may include a request to transfer $25,000.00 from a savings account to a financial account specified by a criminal. As yet another example, the input received may include a request to place a market order to sell $600,000.00 worth of securities at their current market price. It will be apparent to those of skill in the art that many such examples of received input are possible and the foregoing is not intended to limit the spirit, scope, or intent of the disclosure.

The received input, and the instructions associated with the duress shared secret, is then processed to generate a financial transaction. In one embodiment, the financial transaction is generated using financial funds associated with the user. In another embodiment the financial transaction is generated using funds associated with a financial institution. In this embodiment, the financial funds associated with the user are transferred to an intermediary account to facilitate their refund to the user. An amount of financial funds equivalent to those transferred to the intermediary account, but associated with the financial institution, are then used to generate the financial transaction. Once the financial transaction is generated, fraud identification data is then generated from the duress shared secret and data associated with the financial transaction. In one embodiment, the data associated with the financial transaction comprises a unique transaction identifier familiar to those of skill in the art. In one embodiment, the duress shared secret comprises a cryptographic key. In another embodiment, cryptographic operations are performed to encrypt the fraud identification data. In various embodiments, the proceeds are cash funds 216, which are processed and physically tagged with the fraud identification information. In one embodiment, the physical tagging is performed by the transaction tagging module 154. In one embodiment, the cash funds 216 are invisibly imprinted with the fraud identification information. As an example, the fraud identification may be imprinted with ink that is only visible under ultraviolet light. In one embodiment, the fraud identification data comprises a serial number of the cash funds 216, such as a currency serial number printed on a banknote. The tagged cash funds 216 proceeds are then disbursed, such as from an ATM access device 204.

In various other embodiments, the proceeds of the financial transaction are electronic funds, which are tagged with electronic fraud identification data. In one embodiment, the electronic tagging is performed by the transaction tagging module 154. In another embodiment, a cryptographic operation is performed to embed the fraud identification data within the electronic funds data. In various embodiments, the electronic funds data comprises a routing transit number, an interbanking clearing number, of an international bank account number. In various other embodiments, the electronic funds data comprises a destination financial account number. Once the electronic funds are tagged with fraud identification data, the funds transfer of the electronic funds is initiated. In various embodiments, the initiation of the funds transfer is performed by the transaction processing module 152.

In various embodiments, cash funds proceeds of a duress financial transaction are received from an originating financial institution 218 by a receiving financial institution, such as an intermediate financial institution 222 or a destination financial institution 228. Once received, the tagged cash funds are processed to extract their associated fraud identification data. As an example, the invisibly imprinted fraud identification data may be scanned with an ultraviolet scanner and then converted with an optical character recognition (OCR) application to generate a text file. A time-stamped fraud identification query is generated and the extracted fraud identification data is appended. The time-stamped fraud identification query is then transmitted to law enforcement agencies and the originating financial institution 218 for processing. In various embodiments, cryptographic operations familiar to skilled practitioners of the art are performed on the fraud identification data to extract information related to the originating financial institution 218.

If the query response was positive, then a determination is made whether the tagged cash funds are to be deposited or exchanged. If they are to be deposited, then information associated with the deposit account is determined and a time-stamped tagged cash funds alert is then generated by the receiving financial institution 222, 228. The extracted fraud identification data is appended to the time-stamped tagged cash funds alert, which is then transmitted to law enforcement agencies and the originating financial institution 218. The time-stamped tagged cash funds alert, with the appended fraud identification data, is then stored as fraud trail data in the repository of financial transaction, fraud identification, and fraud trail data 210. Data associated with the target deposit account for the tagged cash funds is then processed to tag it with the extracted fraud identification data. The tagged cash funds amount is then deposited in the target deposit account and an account hold is placed on the target deposit account in the amount of the tagged cash funds. The tagged cash funds are then retained for evidence in criminal prosecution and recovery by their originating financial institution 218.

In various embodiments, tagged electronic funds proceeds of a duress financial transaction (EFT) are received from an originating financial institution 218 by a receiving financial institution, such as an intermediate financial institution 222 or a destination financial institution 228. Once received, the tagged EFT is processed to extract its associated fraud identification data and to determine information related to its target receiving account. A time-stamped acknowledgement of the receipt of a tagged EFT ("tagged EFT receipt") is then generated. The extracted fraud identification data and the information related to the target receiving account are then appended to the tagged EFT receipt, which is then transmitted to law enforcement agencies, financial network operators, financial clearing houses, and the originating financial institution. The tagged EFT receipt is then processed and stored in the repository of financial transaction, fraud identification, and fraud trail data 210. The tagged EFT funds are then deposited into the target receiving account.

The target receiving account is then monitored for the generation of a new funds transfer. If a new EFT is generated from the target receiving account, then the data associated with the outbound EFT is processed to determine information associated with the originating account and the destination account. A time-stamped tagged EFT alert ("tagged EFT alert") is generated and the extracted fraud identification data, along with the information associated with the originating account and the destination account, are appended. The tagged EFT alert is then transmitted to law enforcement agencies, financial network operators, clearing houses, and the financial institution that originated the original tagged EFT. Data related to the outbound EFT is then processed and tagged with the extracted fraud identification data, followed by the initiation of the outbound EFT. The tagged EFT alert is then stored in the repository of financial transaction, fraud identification, and fraud trail data 210. It will be apparent to skilled practitioners of the art that a fraud audit trail is provided by successively tagging the proceeds of newly originated EFTs, such as the follow-on fraudulent funds transfer 224, with fraud identification data generated by originating financial institution 218.

In various embodiments, tagged funds are recovered by first selecting a tagged financial transaction initiated by a user while under duress, followed by extracting its associated fraud identification data. Repositories of fraud trail data, as described in greater detail herein, are then queried to identify matching fraud identification data. Once matching fraud identification data has been identified, then fraud trail data corresponding to the matching fraud identification data is retrieved and then processed to determine receiving, or destination, account information. The receiving account is then queried to determine availability of funds. If the receiving account has sufficient funds to cover the amount of the tagged financial transaction, then a rescission transaction 230 is performed to recover the amount of the tagged financial transaction. In various embodiments, the rescission transaction 230 is performed by a transaction rescission module of a fraud management system.

However, if there are insufficient funds available in the receiving account to cover the entire amount of the tagged financial transaction, then a rescission transaction 230 is performed to recover the available funds in the receiving account up. A repository of fraud trail data 210 at the receiving financial institution 222 is queried to identify tagged funds transfer transactions originating from the receiving account. Data related to the follow-on tagged funds transfer transactions 224 is then processed for prioritization. A follow-on tagged funds transfer transaction 224 is selected and then processed to extract financial transaction information related to the destination financial institution 226 and the destination account of the follow-on electronic funds transaction 224. The destination account is then queried to determine the availability of funds and the process is continued with a follow-on rescission transaction 228.

Figure 3A:
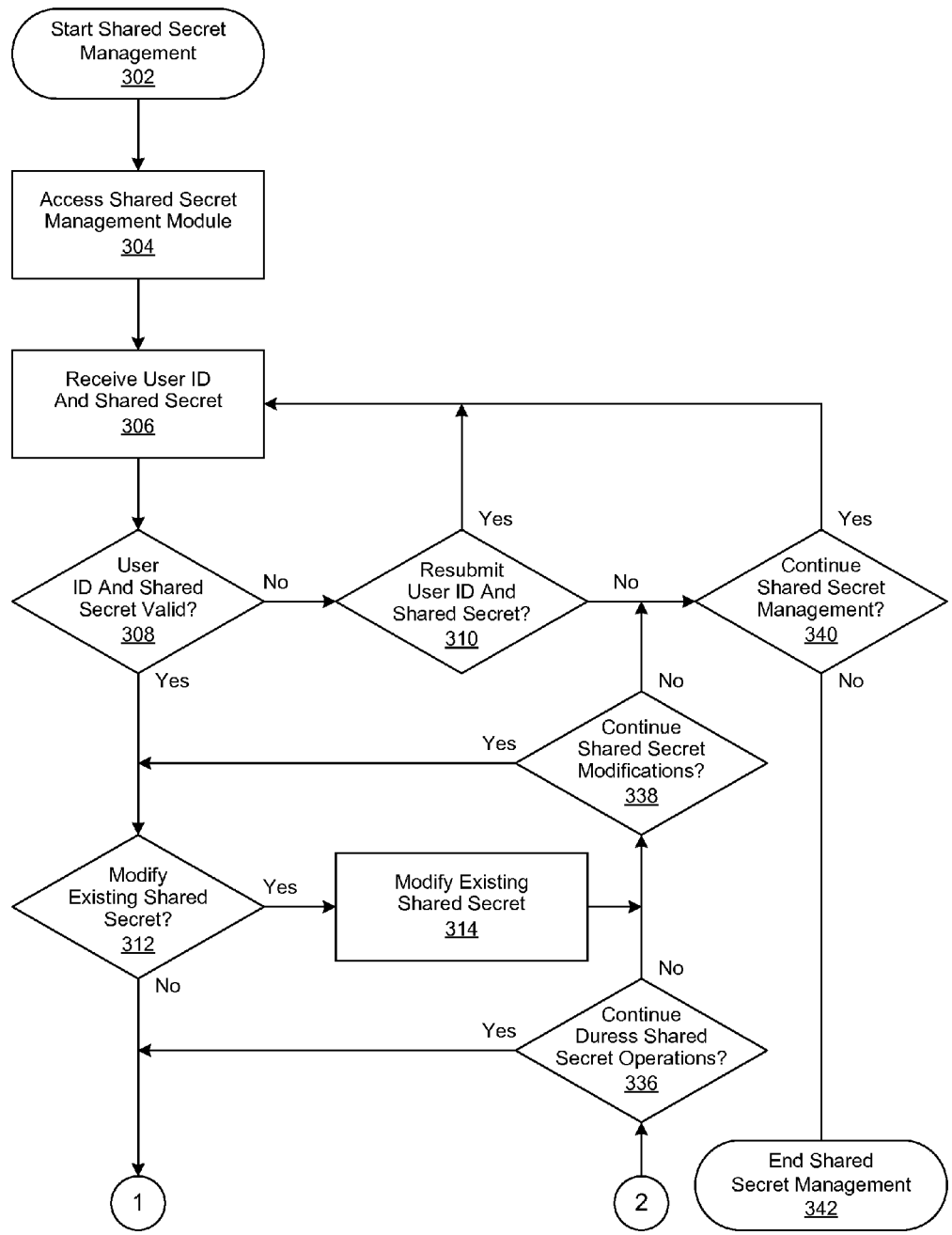
FIGS. 3a-b are a generalized flowchart of the operation of a fraud management system as implemented in accordance with an embodiment of the disclosure for the management of shared secrets.
Figure 3B:
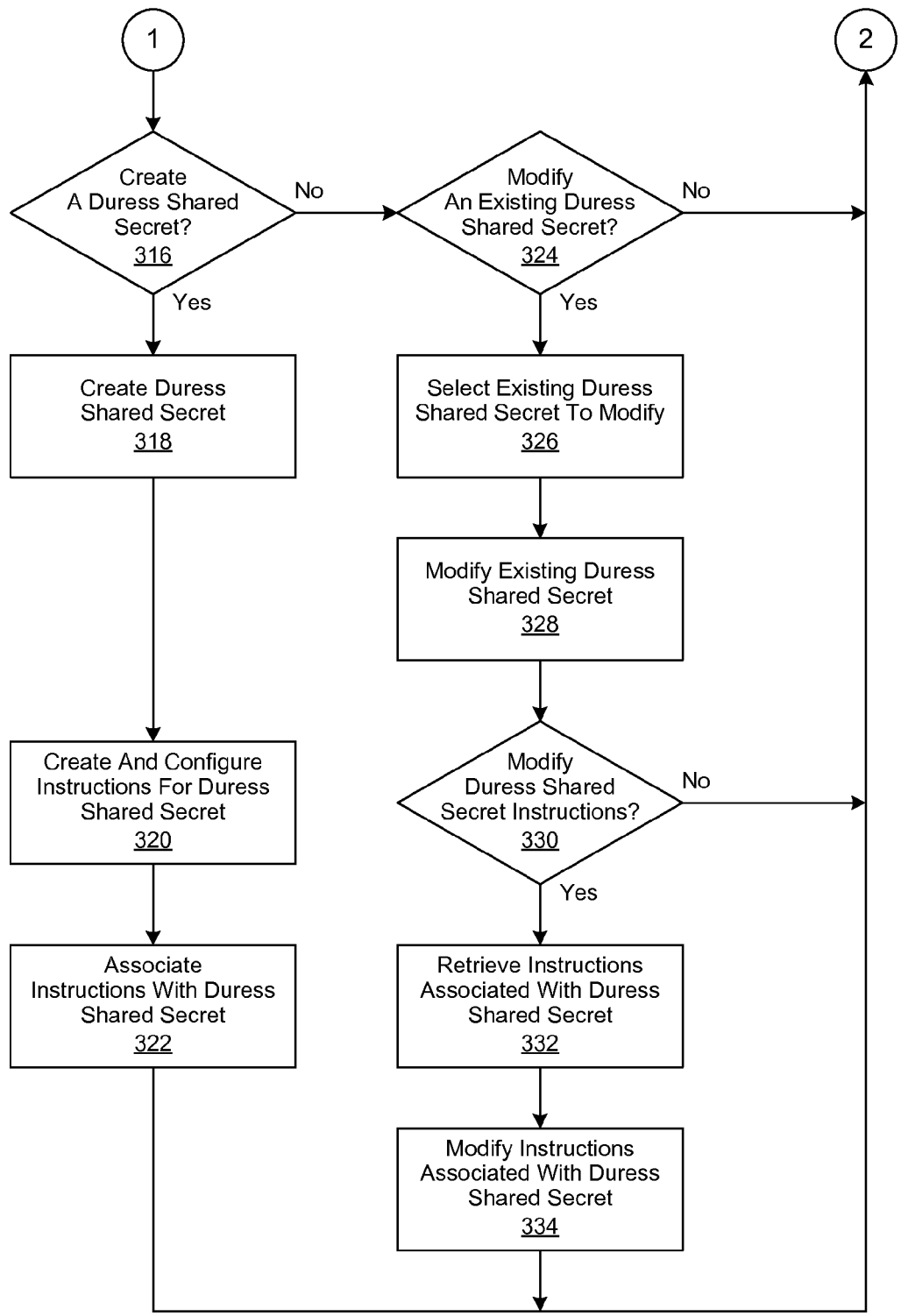
Figure 4A:
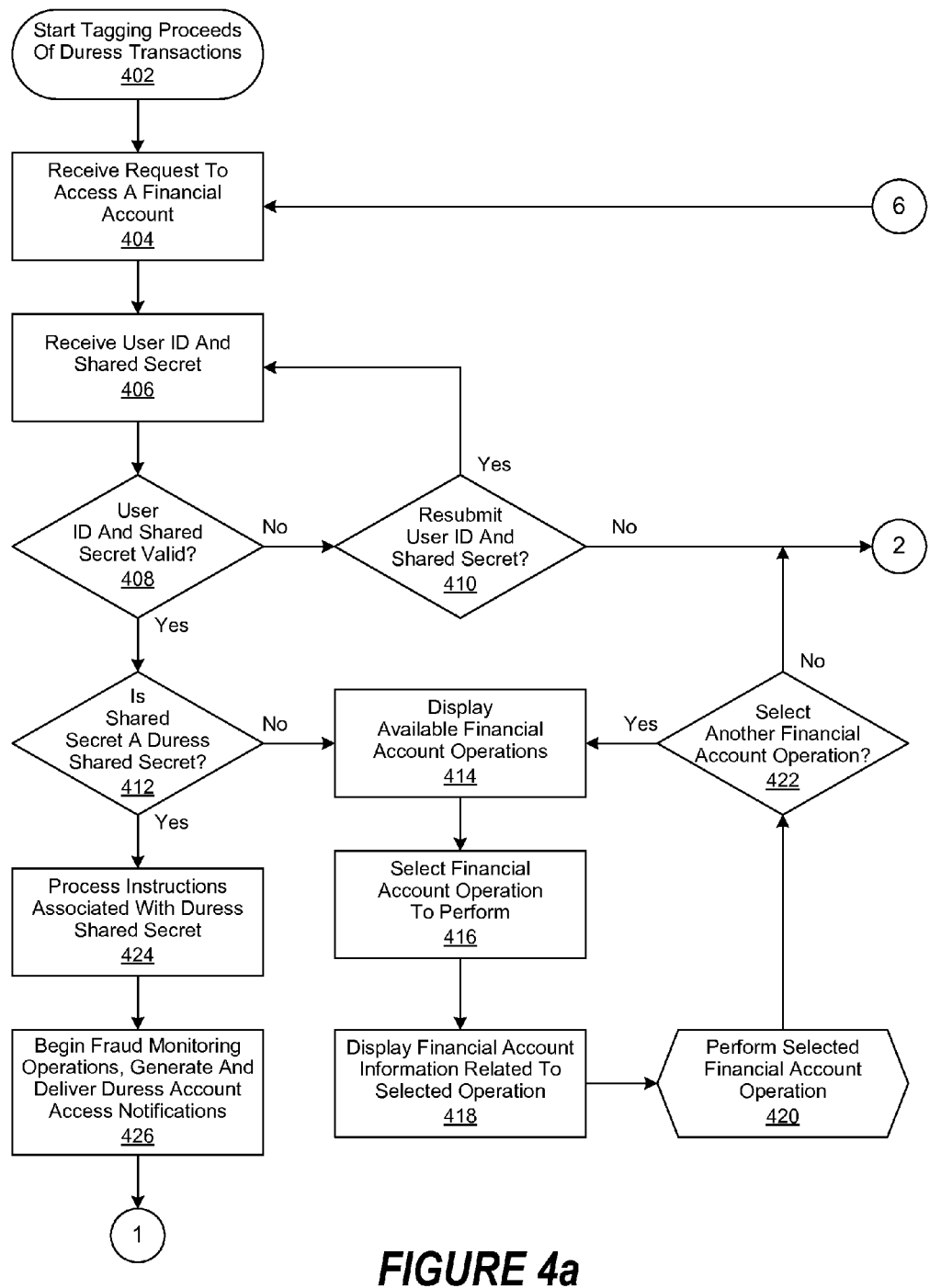
FIGS. 4a-d are a generalized flowchart of the operation of a fraud management system as implemented in accordance with an embodiment of the disclosure for tagging the proceeds of a financial transaction initiated by a user while under duress.
Figure 4B:
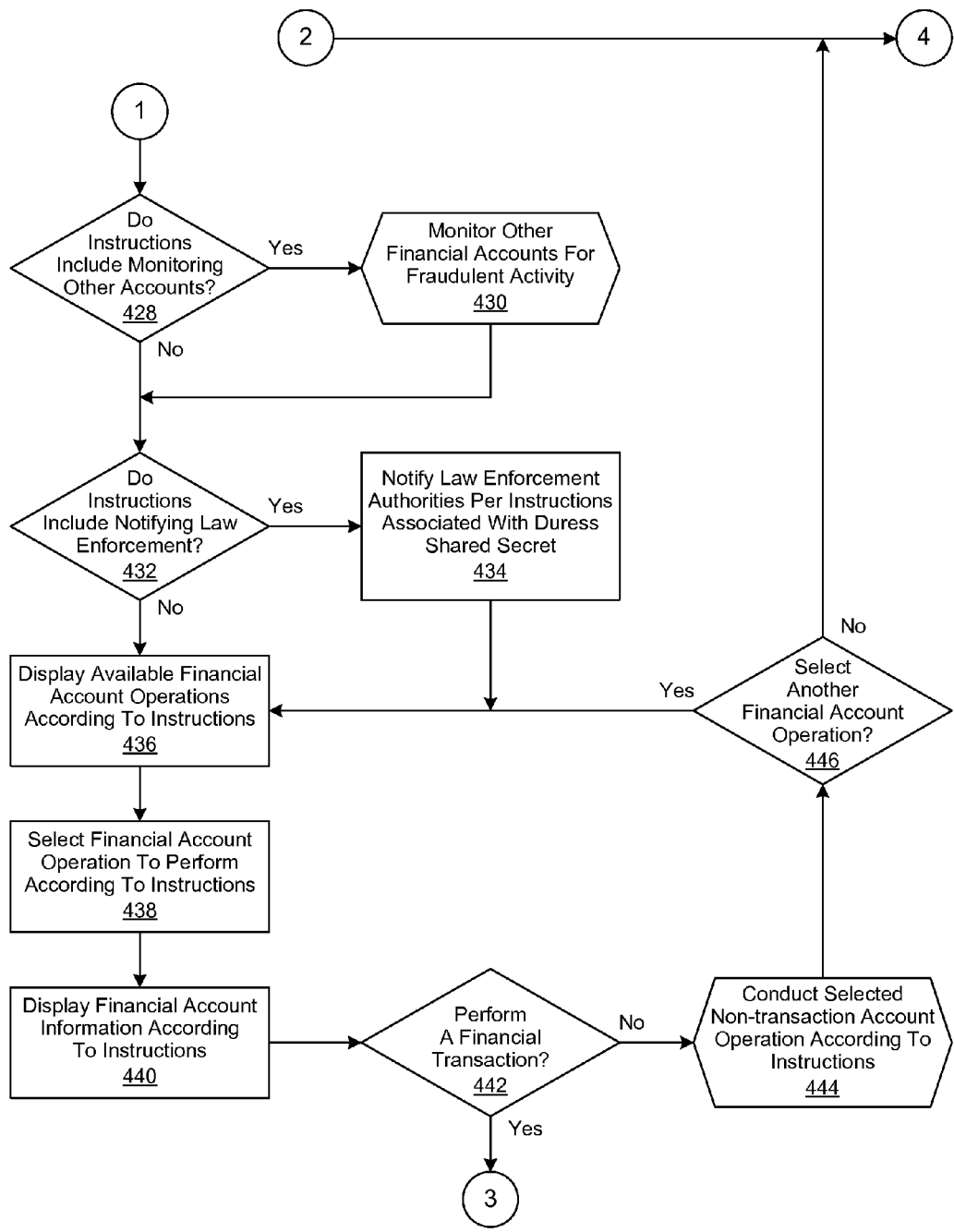
Figure 4C:
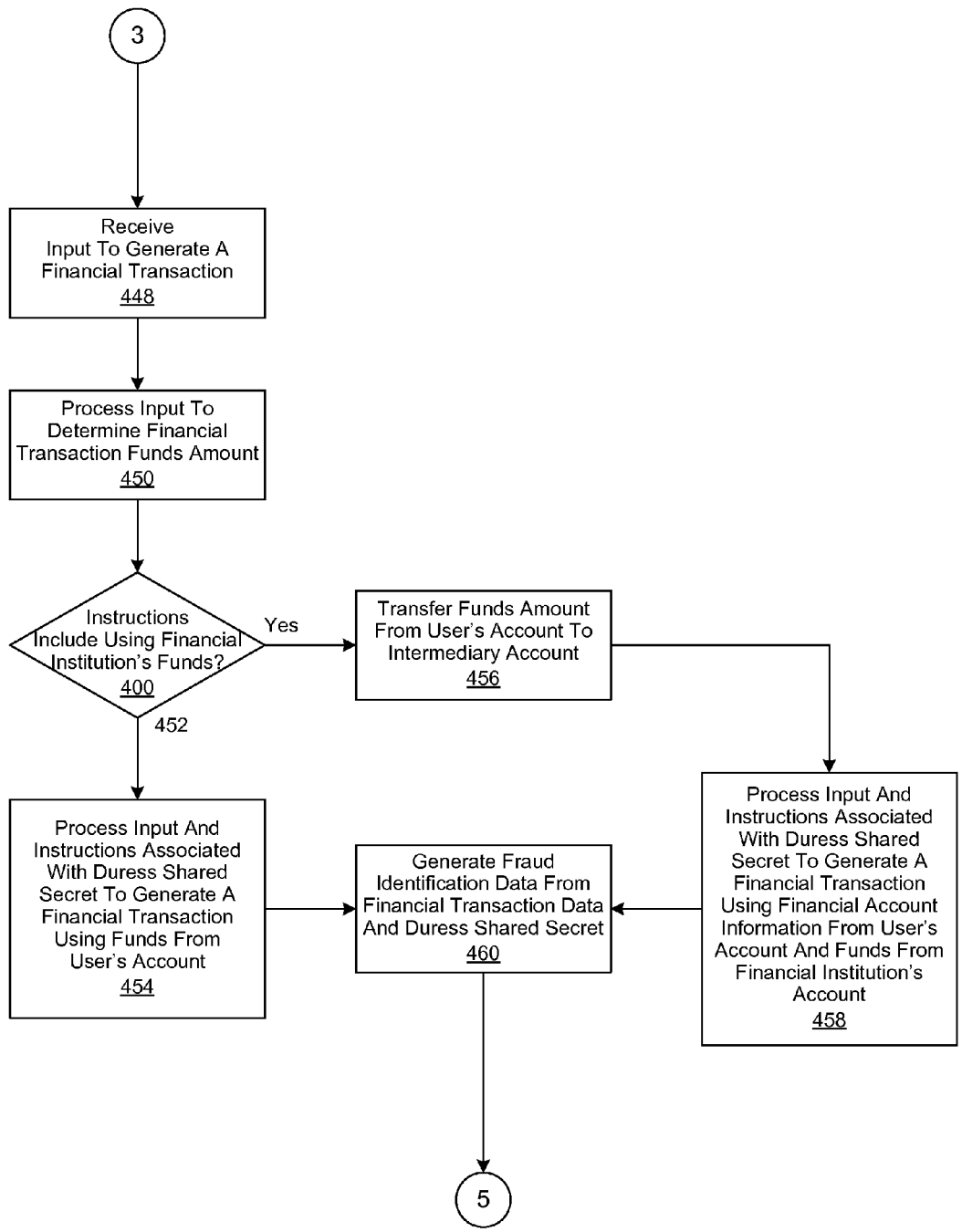
Figure 4D:
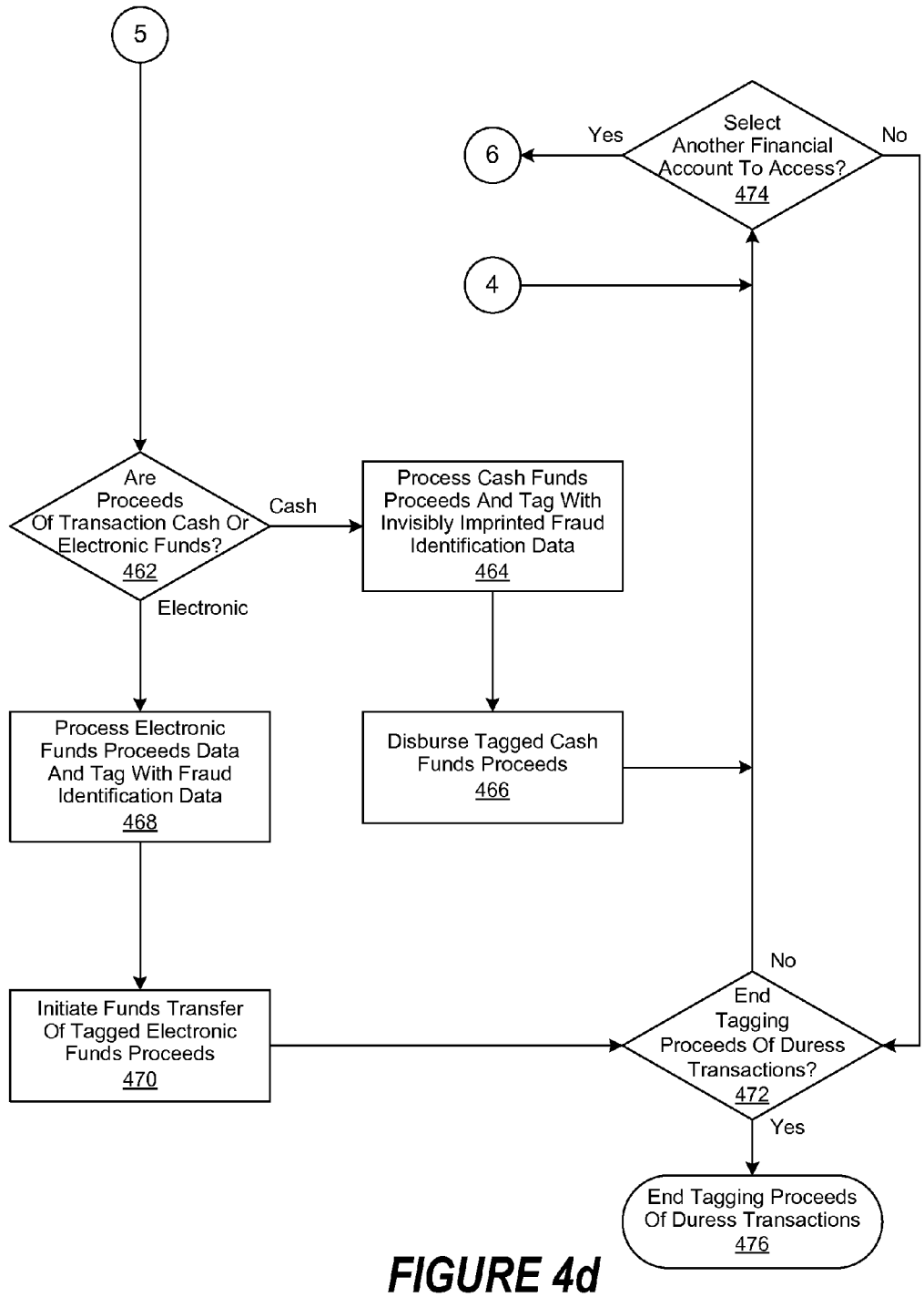

FIGS. 3*a-b* are a generalized flowchart of the operation of a fraud management system as implemented in accordance with an embodiment of the disclosure for the management of shared secrets. In this embodiment, shared secret management operations are begun in block 302, followed by a user accessing a shared secret management module of a fraud management system in block 304. The shared secret management module receives the user's identification (ID) and a shared secret, such as a personal identification number (PIN) or a password, in block 306. A determination is then made in block 308 whether the provided user ID and shared secret are valid. If not, a determination is then made in block 310 regarding whether the user resubmits a user ID and shared secret. If so, the process is continued, proceeding to block 306. Otherwise, a determination is made in block 340 whether to continue shared secret management operations. If so, then the process is continued, proceeding to block 306. Otherwise shared secret management operations are ended in block 342.

However, if it is determined in block 308 that the user ID and shared secret provided by the user is valid, then a determination is made in block 312 whether to modify an existing shared secret. If so, then the existing shared secret is modified in block 314. As an example, the user may wish to change their existing PIN or password. A determination is then made in block 338 whether to continue operations related to the modification of shared secrets. If so, the process is continued, proceeding to block 312. Otherwise, the process is continued, proceeding to block 340. However, if it is determined in block 312 not to modify an existing shared secret, then a determination is made in block 316 whether to create a duress shared secret. If so, then a duress shared secret is created in block 318.

As used herein, a duress shared secret refers to a shared secret provided by a user to indicate that they are providing access to a financial account while under duress. As an example, a user may be coerced into providing such access as a result of being physically, verbally, or emotionally intimidated, either directly or indirectly. To further the example, a criminal may threaten physical harm to a loved one of the user being held hostage if such access is not provided. Many such situations for a user being under duress are possible and the foregoing is not intended to limit the spirit, scope, or intent of the disclosure. In various embodiments, the duress shared secret may be similar to the shared secret normally used by the user. As an example, a punctuation mark (e.g., '!') may be appended to a password, or an additional digit (e.g., '9') may be appended to a PIN. As another example, the duress shared secret may be a mnemonic, such as the first letter of each word in the phrase "I am under duress, help me" (IAUDHM). In one embodiment, the duress shared secret is created by the user. In another embodiment, the duress shared secret is automatically created by a shared secret management module of a fraud management system. It will be apparent to those of skill in the art that the generation of many such shared secrets are possible.

Once the duress shared secret is created in block 318, instructions to be executed by the fraud management system upon use of the duress shared secret are created and configured in block 320. More specifically, the instructions are used to determine the degree of access provided to a financial account, the information related to the financial account that is displayed, and the actions that are allowed to be performed. As an example, use of a duress shared secret may result in the execution of its associated instruction display what appears to be information related to a checking account or a brokerage account. In reality, the displayed information is spoofed to show false information, such as lower balances or amounts. As another example, the execution of the associated instructions may display accurate financial account information, but operations such as a financial funds transfer may be spoofed instead. To further the example, a criminal may know that the victim has a large account balance in their checking account and they wish to force the victim to transfer the funds with wire transfer instructions. If the victim provides a duress shared secret that results in its associated instructions being executed to show a low account balance, then the criminal may further threaten, or physically harm, the victim. In this example, the victim may provide a second duress shared secret whose associated instructions are executed to show the actual account balance. However, in reality the wire transfer operations are spoofed. The criminal, thinking that the wire transfer has been completed, may then leave the scene of the crime. However, today's criminals are becoming more sophisticated and may be able to access a destination account to ensure that an electronic funds transfer was actually completed. If this is the case, then the victim may provide a third duress shared secret whose associated instructions not only display the accurate account, but also allow the wire transfer operations to be performed. However, unbeknownst to the criminal, the duress shared secret is combined with other information, such as the victim's account number and timestamp information. As described in greater detail herein, the information is then processed to generate fraud identification information, which is then tagged to the proceeds of the fraudulently generated financial transaction. The tagged proceeds can then be tracked through the banking system and subsequently recovered.

In addition, the instructions may include issuing a security alert to a law enforcement agency, notifying the fraud department of the financial institution associated with the victim's account, or notifying fraud detection systems associated with the victim's other financial accounts. As an example, if the duress shared secret is provided at an automated teller machine (ATM), then a silent alarm may be sent to the police, along with the physical location of the ATM. As another example, the use of a duress shared secret used from a personal computer located in the victim's home may issue a silent alarm to summon the police to the victim's home. It will be apparent to skilled practitioners of the art that many such instructions are possible and the foregoing is not intended to limit the spirit, scope, or intent of the disclosure. Once instructions are created and configured for the duress shared secret in block 320, they are associated with the duress shared secret in block 322. A determination is then made in block 336 whether to continue duress shared secret operations. If not, then the process is continued, proceeding to block 338. Otherwise, the process is continued, proceeding to block 316.

However, if it is determined in block 316 not to create a duress shared secret, then a determination is made in block 324 whether to modify an existing duress shared secret. If not, then the process is continued, proceeding to block 336. Otherwise, an existing duress shared secret is selected in block 326 and it is then modified in block 338. As an example, the user may wish to modify an existing duress shared secret from a series of numbers to an alphanumeric string. A determination is then made in block 330 whether to modify the instructions associated with the selected duress shared secret. If not, then the process is continued, proceeding to block 336. Otherwise the instructions associated with the selected duress shared secret are retrieved in block 332 and then modified in block 334. As an example, the user may decide to modify the associated instructions such that a first checking account with a low account balance is displayed, but a second checking account with a high account balance is not. The process is then continued, proceeding to block 336.

FIGS. 4*a-d* are a generalized flowchart of the operation of a fraud management system as implemented in accordance with an embodiment of the disclosure for tagging the proceeds of a financial transaction initiated by a user while under duress. In this embodiment, operations for tagging the proceeds of duress financial transactions are begun in block 402, followed by receiving a request to access a financial account in block 404. As used herein, a duress financial transaction is a financial transaction initiated by a user while under duress, as described in greater detail herein. A user's identification (ID) and a shared secret, such as a personal identification number (PIN) or a password, are received in block 406. A determination is then made in block 408 whether the provided user ID and shared secret are valid. If not, a determination is then made in block 410 regarding whether the user resubmits a user ID and shared secret. If so, the process is continued, proceeding to block 406. Otherwise, a determination is made in block 474 whether to select another financial account to access. If so, the process is continued, proceeding to block 404. Otherwise, a determination is made in block 472 whether to end operations for tagging the proceeds of duress financial transactions. If not, then the process is continued, proceeding to block 474. Otherwise, operations for tagging the proceeds of duress financial transactions are ended in block 476.

However, if it is determined in block 408 that the user ID and shared secret are valid, then a determination is made in block 412 whether the provided shared secret is a duress shared secret. As used herein, a duress shared secret refers to a shared secret provided by a user to indicate that they are providing access to a financial account while under duress. If it is determined in block 412 that the provided shared secret is not a duress shared secret, then available financial account operations are displayed in block 414. A financial operation to perform is then selected in block 416, followed by the display of financial account information related to the selected operation in block 418. The selected financial account operation is then performed in block 420, followed by a determination in block 422 whether to select another financial account operation to perform. If so, then the process is continued, proceeding to block 414. Otherwise, the process is continued, proceeding to block 474. However, if it is determined in block 412 that the provided shared secret is a duress shared secret, the instructions associated with the duress shared secret are processed in block 424.

In block 426, fraud monitoring operations are initiated and duress event notifications are generated and delivered, as described in greater detail herein, indicating that the financial account is being accessed while the user is under duress. A determination is then made in block 428 whether the associated instructions include the monitoring of other financial accounts associated with the user. If so, then the other financial accounts are monitored for fraudulent activity in block 430. Otherwise, a determination is made in block 432 whether the instructions include the notification of law enforcement authorities. If so, then the law enforcement authorities listed in the associated instructions are notified in block 434 and are provided their respectively requested response. Otherwise, available financial account operations, per the associated instructions, are displayed in block 436 as described in greater detail herein. An available financial account operation is selected in block 438 to perform according to the associated instructions. Financial information associated with the selected financial account operation is then displayed, according to the associated instructions, in block 440. A determination is then made in block 442 whether the selected financial account operation is to perform a financial account operation to generate a financial transaction. In not, then the selected account operation is performed, according to the associated instructions, in block 444. A determination is then made in block 446 whether to select another financial account operation. If so, then the process is continued, proceeding to block 436. Otherwise, the process is continued, proceeding to block 474.

However, if it is determined in block 442 that the selected financial account operation is to perform a financial transaction, then input is received to generate a financial transaction in block 448. As an example, the input received may include a request to disburse $400.00 in cash funds from an automated teller machine (ATM). As another example, the input received may include a request to transfer $25,000.00 from a savings account to a financial account specified by a criminal. As yet another example, the input received may include a request to place a market order to sell $600,000.00 worth of securities at their current market price. It will be apparent to those of skill in the art that many such examples of received input are possible and the foregoing is not intended to limit the spirit, scope, or intent of the disclosure.

The received input is processed in block 450 to determine the funds amount of the financial transaction, followed by making a determination in block 452 whether the instructions include using funds from a financial account associated with a financial institution. As an example, a financial institution may have a financial account that is used for funding fraudulently generated financial transactions. If it is determined in block 452 not to use a financial account associated with a financial institution, then the received input and the instructions associated with the duress shared secret are processed in block 454 to generate a financial transaction using funds from a financial account associated with the user. However, if it is determined in block 452 to use a financial account associated with a financial institution, then an amount of funds equal to the received input amount is transferred from the financial account associated with the user to an intermediary account in block 456. As an example, the intermediary account may be an account where funds are held in the event of the occurrence of a duress event. Once the duress event has passed, then the user's funds can be recovered from the intermediary account. The received input and the instructions associated with the duress shared secret are then processed in block 458 to generate a financial transaction using financial account information from a financial account associated with the user and funds from a financial account associated with financial institution. Once the financial transaction is generated in block 454 or block 458, fraud identification data is then generated in block 460 from the duress shared secret and data associated with the financial transaction. In one embodiment, the data associated with the financial transaction comprises a unique transaction identifier familiar to those of skill in the art. In one embodiment, the duress shared secret comprises a cryptographic key. In various embodiments, cryptographic operations are performed to encrypt the fraud identification data. A determination is then made in block 462 whether the proceeds of the financial transaction are cash funds or electronic funds. If it is determined in block 462 that the proceeds are cash funds, then they are processed in block 464 and tagged with the fraud identification information. In one embodiment, the cash funds are invisibly imprinted with the fraud identification information. As an example, the fraud identification may be imprinted with ink that is only visible under ultraviolet light. In one embodiment, the fraud identification data comprises a cash funds serial number, such as a currency serial number printed on a banknote. The tagged cash funds proceeds are then disbursed in block 466 and the process continues, proceeding to block 474.

However, if it is determined in block 462 that the proceeds of the financial transaction are electronic funds, then data associated with electronic funds is tagged with the fraud identification data in block 468. In one embodiment, a cryptographic operation is performed to embed the fraud identification data within the electronic funds data. In various embodiments, the electronic funds data comprises a routing transit number, an interbanking clearing number, of an international bank account number. In various other embodiments, the electronic funds data comprises a destination financial account number. Once the electronic funds are tagged with fraud identification data in block 470, the funds transfer of the electronic funds is initiated in block 470. A determination is then made in block 472 whether to end operations for tagging the proceeds of duress financial transactions. If not, then the process is continued, proceeding to block 474. Otherwise, operations for tagging the proceeds of duress financial transactions are ended in block 476.

Figure 5A:
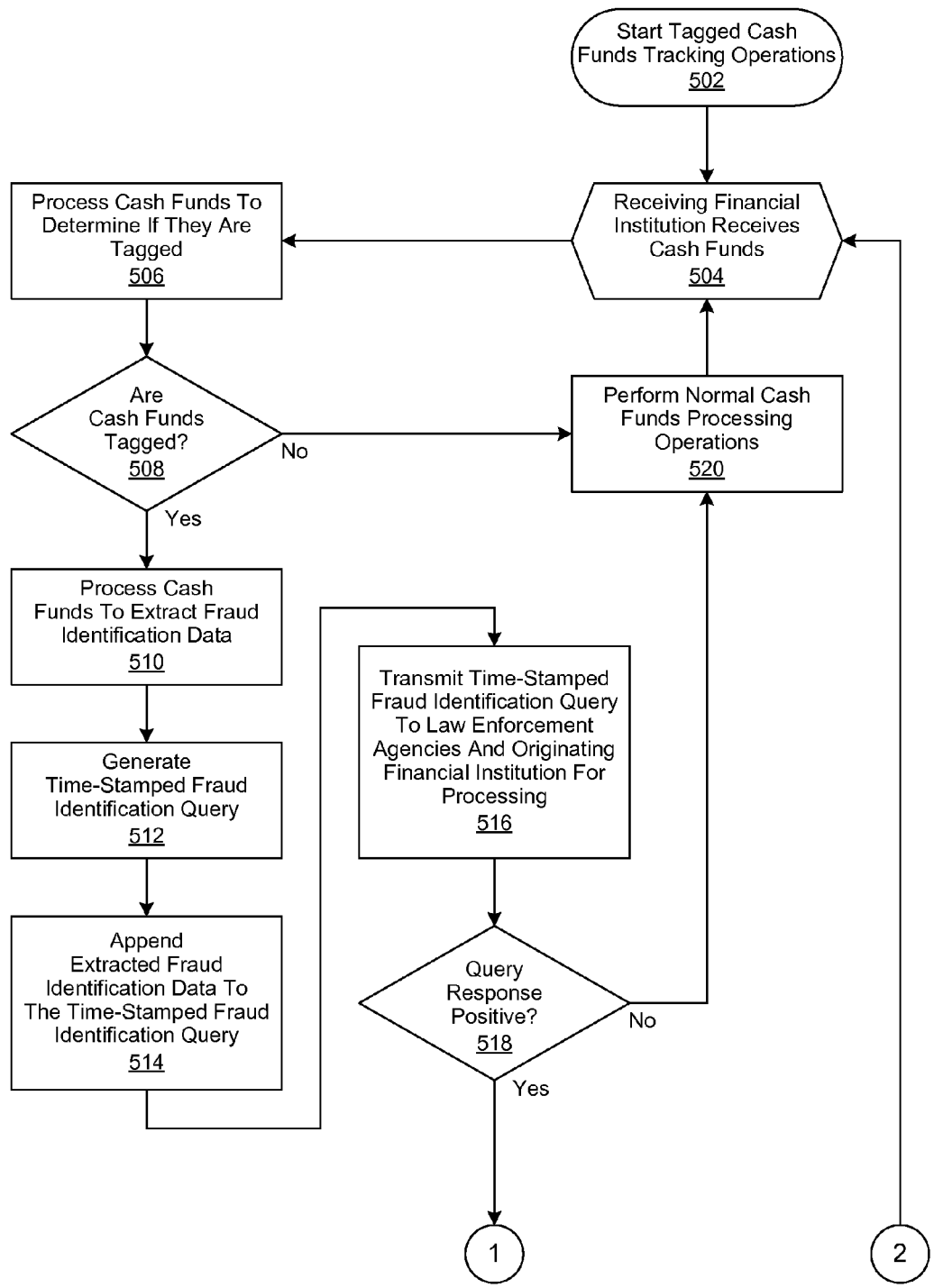
FIGS. 5a-b are a generalized flowchart of the operation of a fraud management system as implemented in accordance with an embodiment of the disclosure for tracking tagged cash funds proceeds of a financial transaction initiated by a user while under duress.
Figure 5B:
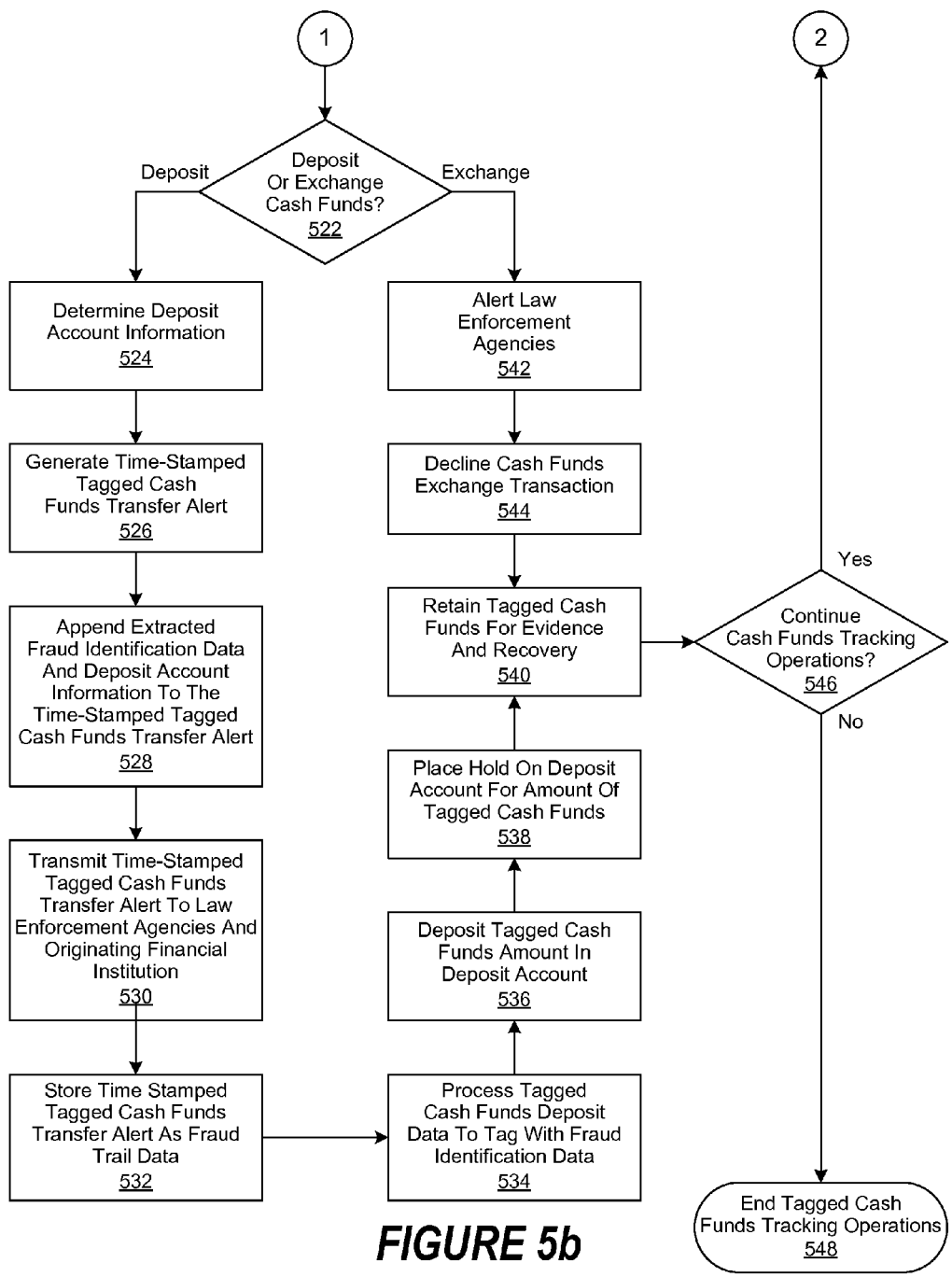

FIGS. 5*a*-*b* are a generalized flowchart of the operation of a fraud management system as implemented in accordance with an embodiment of the disclosure for tracking tagged cash funds proceeds of a financial transaction initiated by a user under duress. In this embodiment, operations for the tracking of tagged cash funds proceeds of a duress financial transaction are begun in block 502, followed by the receipt of cash funds by a receiving financial institution in block 504. In block 506, the cash funds are processed to determine if they are tagged. As an example, banknotes may be viewed under an ultraviolet light to reveal invisibly imprinted fraud identification data. A determination is then made in block 508 whether the cash funds are tagged. If not, then normal cash funds processing operations are performed in block 520 and the process is continued, proceeding to block 504.

However, if is determined in block 508 that the cash funds are tagged, then they are further processed in block 510 to extract their associated fraud identification data. As an example, the invisibly imprinted fraud identification data may be scanned with an ultraviolet scanner and then converted with an optical character recognition (OCR) application to generate a text file. In block 512, a time-stamped fraud identification query is generated. The extracted fraud identification data is then appended in block 514 to the time-stamped fraud identification query, which is then transmitted to law enforcement agencies and the originating financial institution for processing. In various embodiments, cryptographic operations familiar to skilled practitioners of the art are performed on the fraud identification data to extract information related to the originating financial institution. As an example, the receiving financial institution may use their private key and a corresponding public key used by an originating financial institution to generate fraud identification data.

A determination is then made in block 518 whether the query response was positive. If not, then the process is continued, proceeding to block 520. As an example, the cash funds may have been the proceeds of a duress financial transaction that has been resolved, and the fraud identification data is no longer associated with an unresolved criminal incident, but remains invisibly imprinted on a banknote. However, if it is determined in block 518 that the query response was positive, then a determination is made in block 522 whether the tagged cash funds are to be deposited or exchanged. As an example, a criminal may attempt to launder the tagged cash funds by exchanging them for another form of financial value, such as a cashiers check or a money order. Alternatively, the criminal may attempt to deposit the tagged cash funds into a deposit account and then launder the funds with a wire transfer to another financial account. Skilled practitioners of the art will realize that many such money laundering schemes are known.

If it is determined in block 522 that the tagged cash funds are to be deposited, then information associated with the deposit account is determined in block 524. A time-stamped tagged cash funds alert is then generated in block 526 by the receiving financial institution. The extracted fraud identification data is appended in block 528 to the time-stamped tagged cash funds alert, which is then transmitted in block 530 to law enforcement agencies and the originating financial institution. The time-stamped tagged cash funds alert, with the appended fraud identification data, is then stored as fraud trail data in block 532. Data associated with the target deposit account for the tagged cash funds is then processed in block 534 to tag it with the extracted fraud identification data. The tagged cash funds amount is then deposited in the target deposit account in block 536 and an account hold is placed on the target deposit account in the amount of the tagged cash funds in block 538. The tagged cash funds are then retained in block 540 for evidence in criminal prosecution and recovery by their originating financial institution. A determination is then made in block 546 whether to continue operations for the tracking of tagged cash funds proceeds. If so, the process is continued, proceeding to block 504. Otherwise, operations for the tracking of tagged cash funds proceeds are ended in block 548. However, if it is determined in block 522 that the tagged cash funds are to be exchanged, the law enforcement agencies are alerted in block 542 and the requested cash funds exchange transaction is declined in block 544. The process is then continued, proceeding to block 540.

Figure 6A:
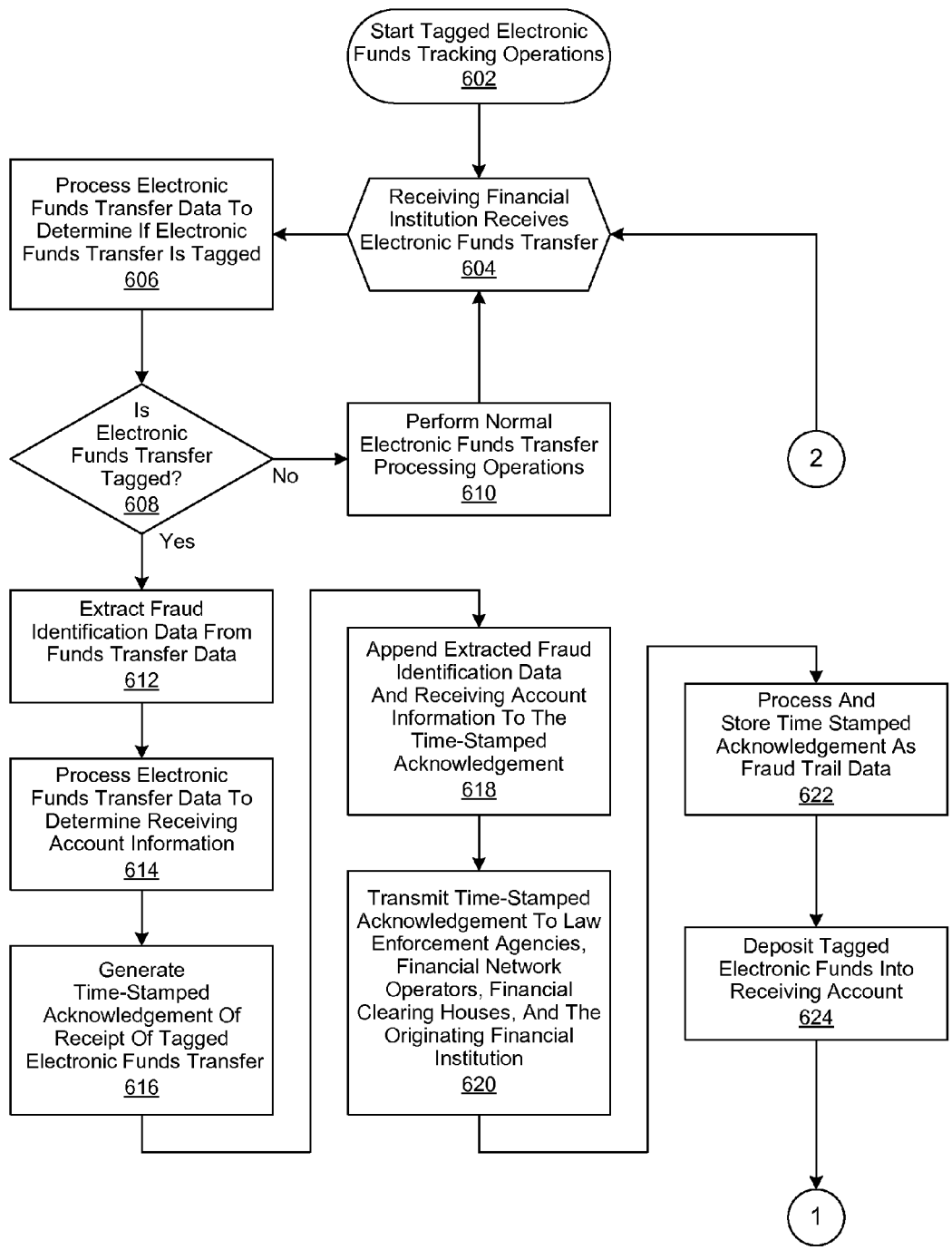
FIGS. 6a-b are a generalized flowchart of the operation of a fraud management system as implemented in accordance with an embodiment of the disclosure for tracking tagged electronic funds proceeds of a financial transaction initiated by a while user under duress.
Figure 6B:
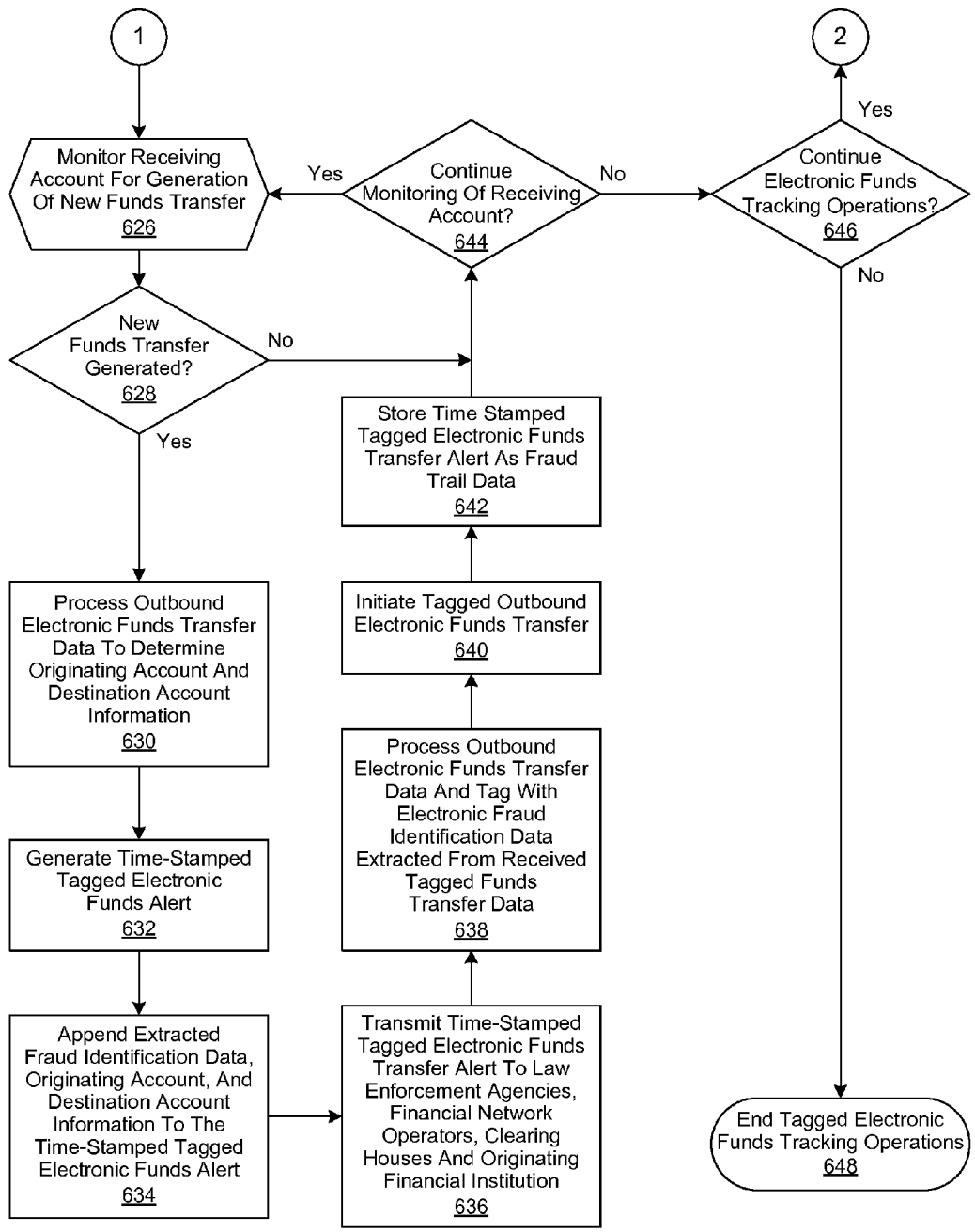

FIGS. 6*a*-*b* are a generalized flowchart of the operation of a fraud management system as implemented in accordance with an embodiment of the disclosure for tracking tagged electronic funds proceeds of a financial transaction initiated by a user while under duress. In this embodiment, operations for the tracking of tagged electronic funds proceeds of a duress financial transaction are begun in block 602, followed by the receipt of electronic funds by a receiving financial institution in block 604. In block 606, the electronic funds are processed to determine if they have been tagged with fraud identification data as described in greater detail herein. A determination is then made in block 608 whether the electronic funds are tagged. If not, then normal electronic funds transfer (EFT) processing operations are performed in block 610 and the process is continued, proceeding to block 604.

However, if is determined in block 608 that the EFT is tagged, then it is further processed in block 612 to extract its associated fraud identification data. In block 614, the EFT data is then processed to determine information related to its target receiving account. A time-stamped acknowledgement of the receipt of a tagged EFT ("tagged EFT receipt") is then generated in block 616. The extracted fraud identification data and the information related to the target receiving account are then appended in block 618 to the tagged EFT receipt. The tagged EFT receipt is then transmitted in block 620 to law enforcement agencies, financial network operators, financial clearing houses, and the originating financial institution. The tagged EFT receipt is then processed and stored in block 622 as fraud trail data. The tagged EFT funds are then deposited into the target receiving account in block 624.

The target receiving account is then monitored in block 626 for the generation of a new funds transfer. A determination is then made in block 628 whether a new funds transfer has been generated to transfer funds out of the target receiving account. If not, then a determination is made in block 644 whether to continue monitoring of the target receiving account. If so, then the process is continued, proceeding to block 626. Otherwise, a determination is made in block 646 whether to continue operations for the tracking of tagged electronic funds. If so, then the process is continued, proceeding to block 604. Otherwise, operations for the tracking of tagged electronic funds are ended in block 648.

However, if it is determined in block 628 that a new EFT has been generated from the target receiving account, then the data associated with the outbound EFT are processed in block 630 to determine information associated with the originating account and the destination account. A time-stamped tagged EFT alert ("tagged EFT alert") is generated in block 632. Then in block 634 the extracted fraud identification data, and the information associated with the originating account and the destination account, are appended the tagged EFT alert. The tagged EFT alert is then transmitted in block 636 to law enforcement agencies, financial network operators, clearing houses, and the financial institution that originated the original tagged EFT. Data related to the outbound EFT is then processed and tagged with the extracted fraud identification data in block 638, followed by the initiation of the outbound EFT in block 640. The tagged EFT alert is then stored in block 642 by the receiving financial institution as fraud trail data and the process is continued, proceeding with block 644. It will be apparent to skilled practitioners of the art that a fraud audit trail is provided by successively tagging the proceeds of newly originated EFTs with fraud identification data generated by financial institution that originated the original tagged EFT.

Figure 7A:
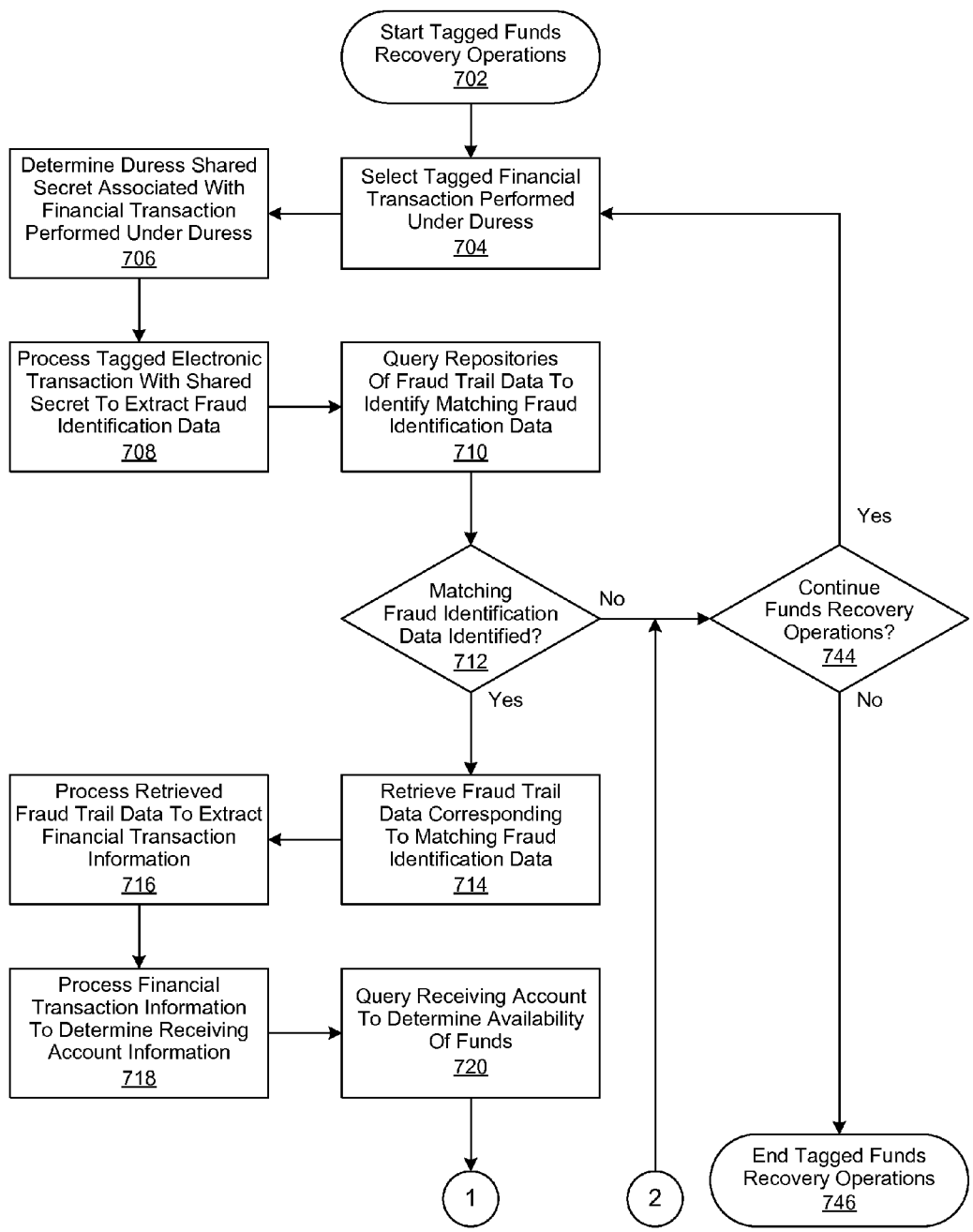
FIGS. 7a-b are a generalized flowchart of the operation of a fraud management system as implemented in accordance with an embodiment of the disclosure for recovering tagged funds proceeds of a financial transaction initiated by a user while under duress.
Figure 7B:
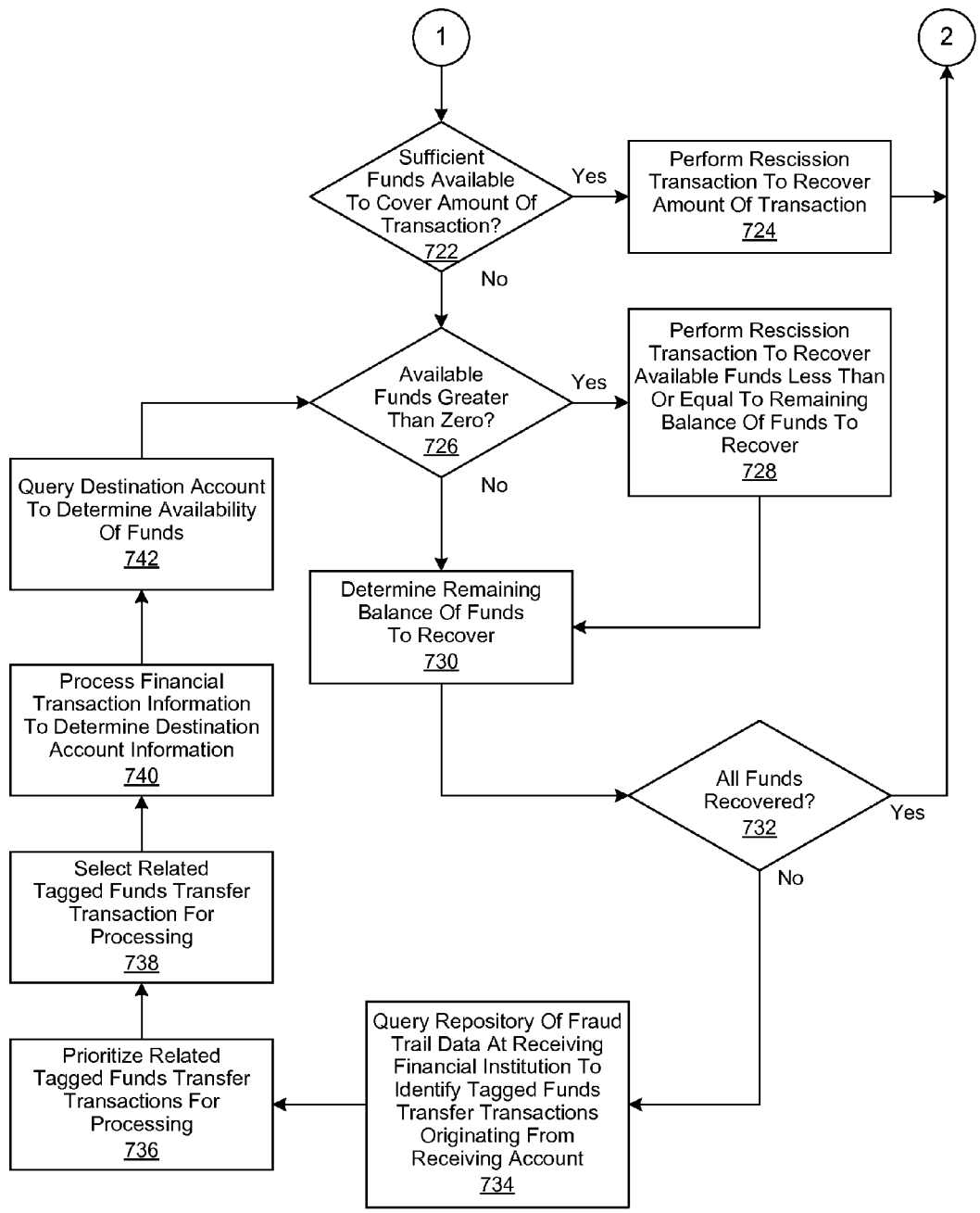

FIGS. 7a-b are a generalized flowchart of the operation of a fraud management system as implemented in accordance with an embodiment of the disclosure for recovering tagged funds proceeds of a financial transaction initiated by a user under duress. In this embodiment, tagged funds recovery operations are begun in block 702, followed by the selection in block 704 of a tagged financial transaction initiated by a user while under duress. In block 706, the duress shared secret associated with the selected duress financial transaction is determined. Then, in block 708, the duress shared secret is used to process the tagged electronic transaction to extract its associated fraud identification data. Repositories of fraud trail data, as described in greater detail herein, are then queried in block 710 to identify matching fraud identification data. A determination is made in block 712 whether matching fraud data has been identified. If not, then a determination is made in block 744 whether to continue tagged funds recovery operations. If so, then the process is continued, proceeding to block 704. Otherwise, tagged funds recovery operations are ended in block 746.

However, if it is determined in block 712 that matching fraud identification data has been identified, then fraud trail data corresponding to the matching fraud identification data is retrieved in block 714. The retrieved fraud trail data is then processed in block 716 to extract financial transaction information, which is then processed in block 718 to determine receiving, or destination, account information. In one embodiment, the fraud trail data is likewise further processed to extract associated fraud identification data. As an example, in various embodiments, additional fraud identification data may have been added by intermediate financial institutions. Once the receiving account data has been extracted in block 718, the receiving account is then queried in block 720 to determine availability of funds. A determination is then made in block 722 to determine if the receiving account has sufficient funds to cover the amount of the tagged financial transaction. If so, then a rescission transaction familiar to skilled practitioners of the art is performed in block 724 to recover the amount of the tagged financial transaction from the receiving account. In various embodiments, the rescission transaction is performed by a transaction rescission module of a fraud management system. The process is then continued, proceeding to block 744.

However, if it is determined in block 722 that there are insufficient funds available in the receiving account to cover the entire amount of the tagged financial transaction, then a determination is made in block 726 if the available funds amount in the receiving account is greater than zero. If so, then a rescission transaction is performed in block 728 to recover the available funds in the receiving account up to the remaining balance of funds to recover. Once the rescission transaction is performed in block 728, or if it is determined in block 726 that the available funds in the receiving account are not greater than zero, then the remaining amount of funds to recover is determined in block 730. A determination is then made in block 732 whether all funds have been recovered. If not, the process is continued, proceeding to block 744. Otherwise, a repository of fraud trail data at the receiving financial institution is queried in block 734 to identify tagged funds transfer transactions originating from the receiving account. Data related to the newly originated tagged funds transfer transactions is then processed for prioritization in block 736. In one embodiment, the related tagged funds transfer transactions are prioritized according to their transaction time stamp. In another embodiment the related tagged funds transfer transactions are prioritized according to the amount of the transaction. A related tagged funds transfer transaction is then selected in block 738 and then processed in block 740 to extract financial transaction information related to the destination account of the electronic funds transaction. The destination account is then queried to determine the availability of funds in block 742 and the process is continued, proceeding to block 726.

The flowchart and block diagrams in the figures illustrate the architecture, functionality, and operation of possible implementations of systems, methods and computer program products according to various embodiments of the disclosure. Accordingly, each block in the flowchart or block diagrams may represent a module, segment, or portion of code, which comprises one or more executable instructions for implementing the specified logical function(s). In certain alternative implementations, the functions performed in a particular block may occur in an order that is different than what is noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The term "embodiment" can be used to describe any aspect, feature, process or step, any combination thereof, and/or any portion thereof, of the disclosure and should not be interpreted as limiting the scope of the application or claims.

While the disclosure has been described by reference to particular embodiments, such references do not imply a limitation and no such limitation is to be inferred. As such, the disclosure includes any and all embodiments having equivalent elements, modifications, omissions, combinations (e.g., of aspects across various embodiments), adaptations, alterations, and equivalents in form and function. As will be further appreciated by those skilled in the pertinent arts, the disclosure has a number of aspects and embodiments, and various embodiments may include overlapping features.

For example, the above-discussed embodiments may include software modules that include script, batch, or other executable files for the performance of certain tasks. These software modules may be stored on a machine-readable or computer-readable storage medium such as a disk drive. Storage devices used for storing software modules in accordance with various embodiments may include magnetic floppy disks, hard disks, or optical discs such as CD-ROMs or DVDs. A storage device used for storing firmware or hardware modules in accordance with an embodiment may also include a semiconductor-based memory, which may be permanently, removably or remotely coupled to a microprocessor/memory system. Thus, the software modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module. In addition, each of the referenced components in this embodiment may be comprised of a plurality of components, each interacting with the other in a distributed environment. Furthermore, other embodiments may expand on the referenced embodiment to extend the scale and reach of the system's implementation.

The description of the disclosure has been presented for purposes of illustration and description, but is not intended to be exhaustive or limited in the form disclosed. It will be apparent to those of skill in the art that many modifications and variations are possible without departing from the scope and spirit of the disclosure, giving full cognizance to equivalents in all respects.

What is claimed is:

1. A non-transitory computer-usable medium embodying computer program code, the computer program code including a set of duress instructions corresponding to a duress shared secret data element, said computer program code when executed by a processor cause the processor to perform a method, the method comprising:
    receiving user input data comprising said duress shared secret data element;
    processing said duress instructions to generate a first financial transaction from financial account data of a repository of financial account data associated with a user, said first financial transaction comprising financial transaction data, wherein said duress instructions include an indication to use one of funds from a financial account associated with a financial institution and funds from a financial account associated with said user for said first financial transaction;
    generating fraud identification data from said financial transaction data and said duress shared secret data element;
    processing proceeds of said first financial transaction to tag said proceeds with said fraud identification data; and
    processing a rescission transaction to recover said tagged proceeds.

2. The computer usable medium of claim 1, wherein processing the proceeds of said first financial transaction includes:
    transferring the proceeds from said financial account associated with said user to an intermediary account;
    generating a second financial transaction using an equivalent amount of said financial funds corresponding to said financial account associated with a second financial institution; and
    processing said proceeds of said second financial institution to tag said proceeds with said fraud identification data.

3. The computer usable medium of claim 1, wherein said proceeds comprise cash funds invisibly imprinted with said fraud identification data.

4. The computer usable medium of claim 1, wherein said proceeds comprise electronic funds further comprising electronic funds data.

5. The computer usable medium of claim 4, wherein said electronic funds data comprise a unique financial transaction tracking identifier further comprising said fraud identification data.

6. The computer usable medium of claim 1, wherein said duress shared secret data element comprises a cryptographic key.

7. The computer usable medium of claim 1, wherein the computer program code is provided to a client computer from a server, wherein said server is located at a remote location.

8. The computer usable medium of claim 1, wherein the computer program code is provided as a service on an on-demand basis, wherein said service is provided by a service provider.

9. A system for identifying financial transactions, comprising:
    a user interface operable to receive input data from a user, said input data comprising a duress shared secret data element; and
    a computing device with a processor and memory for storing executable instructions, including a set of duress instructions corresponding to said duress shared secret data element, that are executable by the processor, wherein the processor is programmed to:
    process said duress instructions to generate a first financial transaction from financial account data of a repository of financial account data associated with said user, said first financial transaction comprising financial transaction data, wherein said instructions include an indication to use one of funds from a financial account associated with a financial institution and funds from a financial account associated with said user for said first financial transaction;
    generate fraud identification data from said financial transaction data and said duress shared secret data element;
    process proceeds of said financial transaction to tag said proceeds with said fraud identification data; and
    process a rescission transaction to recover said tagged proceeds.

10. The system of claim 9, wherein:
    said proceeds of said first financial transaction are transferred from said financial account associated with said user to an intermediary account;
    a second financial transaction is generated using an equivalent amount of said financial funds corresponding to said financial account associated with a financial institution; and
    proceeds of said second financial institution are processed to tag said proceeds with said fraud identification data.

11. The system of claim 9, wherein said proceeds comprise cash funds invisibly imprinted with said fraud identification data.

12. The system of claim 9, wherein said proceeds comprise electronic funds further comprising electronic funds data.

13. The system of claim 12, wherein said electronic funds data comprise a unique financial transaction tracking identifier further comprising said fraud identification data.

14. The system of claim 9, wherein said duress shared secret data element comprises a cryptographic key.

15. A non-transitory computer-usable medium embodying computer program code, the computer program code including a set of duress instructions corresponding to a duress shared secret data element, said computer program code when executed by a processor cause the processor to perform a method, the method comprising:
    receiving user input data comprising a said duress shared secret data element;

processing said duress instructions to generate a financial transaction from financial account data of a repository of financial account data associated with a user, said financial transaction comprising financial transaction data, wherein said duress instructions include an indication to use one of funds from a financial account associated with a financial institution and funds from a financial account associated with said user for said first financial transaction;

generating fraud identification data from said financial transaction data and said duress shared secret data element;

processing proceeds of said first financial transaction to tag said proceeds with said fraud identification data; and processing a rescission transaction to recover said tagged proceeds.

16. The computer usable medium of claim 15, wherein a duress event notification comprises a unique financial transaction tracking identifier further comprising said fraud identification data.

17. The computer usable medium of claim 16, wherein a duress event notification is communicated to a financial institution generating said financial transaction, said financial transaction data and said unique financial transaction tracking identifier communicated with said duress event notification.

18. The computer usable medium of claim 15, wherein a duress event notification comprises location data corresponding to the location of a user.

19. The computer usable medium of claim 18, wherein said location data is communicated to a law enforcement agency.

20. The computer usable medium of claim 15, wherein a location data is communicated to a financial institution generating said financial transaction.

21. The computer usable medium of claim 15, wherein the computer program code is provided to a client computer from a server, wherein said server is located at a remote location.

22. The computer usable medium of claim 15, wherein the computer program code is provided as a service on an on-demand basis, wherein said service is provided by a service provider.

23. A non-transitory computer-usable medium embodying computer program code, the computer program code including a set of duress instructions corresponding to a duress shared secret data element, said computer program code when executed by a processor cause the processor to perform the method:

processing said duress instructions to generate a first financial transaction from financial account data of a repository of financial account data associated with said user, said first financial transaction comprising a first set of said financial transaction data;

generating said fraud identification data from said first set of said financial transaction data and said duress shared secret data element, wherein said duress instructions include an indication to use one of funds from a financial account associated with a financial institution and funds from a financial account associated with said user for said first financial transaction;

processing proceeds of said first financial transaction to tag said proceeds with said fraud identification data;

tracking said fraud identification data through a chain of second financial transactions to generate fraud trail data comprising a second set of said financial transaction data; and processing a rescission transaction to recover said tagged proceeds.

24. The computer usable medium of claim 23, wherein said proceeds comprise cash funds further comprising at least one serial number.

25. The computer usable medium of claim 24, wherein said second set of financial transaction data comprises said at least one serial number.

26. The computer usable medium of claim 23, wherein:
said proceeds comprise electronic funds further comprising electronic funds data; and
said second set of financial transaction data comprises a routing transit number.

27. The computer usable medium of claim 23, wherein:
said proceeds comprise electronic funds further comprising electronic funds data; and
said second set of financial transaction data comprises an interbanking clearing number.

28. The computer usable medium of claim 23, wherein:
said proceeds comprise electronic funds further comprising electronic funds data; and
said second set of financial transaction data comprises an international bank account number.

29. The computer usable medium of claim 23, wherein the computer program code is provided to a client computer from a server, wherein said server is located at a remote location.

30. The computer usable medium of claim 23, wherein the computer program code is provided as a service on an on-demand basis, wherein said service is provided by a service provider.

* * * * *